(12) United States Patent
Yang et al.

(10) Patent No.: US 12,095,702 B2
(45) Date of Patent: Sep. 17, 2024

(54) COMMUNICATION METHOD AND COMMUNICATION APPARATUS APPLIED TO WIRELESS COMMUNICATION SYSTEM

(71) Applicant: HUAWEI TECHNOLOGIES CO., LTD., Guangdong (CN)

(72) Inventors: Mao Yang, Xi'an (CN); Zhongjiang Yan, Xi'an (CN); Weimin Wu, Xi'an (CN); Limin Liao, Xi'an (CN); Yunbo Li, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 17/469,413

(22) Filed: Sep. 8, 2021

(65) Prior Publication Data

US 2021/0409179 A1 Dec. 30, 2021

Related U.S. Application Data

(63) Continuation of application No. PCT/CN2020/077893, filed on Mar. 5, 2020.

(30) Foreign Application Priority Data

Mar. 8, 2019 (CN) .......................... 201910176456.6

(51) Int. Cl.
*H04L 5/00* (2006.01)
*H04W 48/08* (2009.01)

(52) U.S. Cl.
CPC .......... *H04L 5/0053* (2013.01); *H04L 5/0035* (2013.01); *H04L 5/0046* (2013.01); *H04L 5/0094* (2013.01); *H04W 48/08* (2013.01)

(58) Field of Classification Search
CPC ... H04L 5/0053; H04L 5/0035; H04L 5/0046; H04L 5/0094; H04W 48/08
See application file for complete search history.

(56) References Cited

U.S. PATENT DOCUMENTS

| 10,972,196 B1 * | 4/2021 | Chu ....................... H04B 17/27 |
| 2011/0205968 A1 | 8/2011 | Kim et al. |

(Continued)

FOREIGN PATENT DOCUMENTS

| CN | 105191462 A | 12/2015 |
| JP | 2012529217 A | 11/2012 |

(Continued)

OTHER PUBLICATIONS

IEEE Computer Society et al., Part 11:Wireless LAN Medium Access Control (MAC) and Physical Layer (PHY) Specifications, Amendment 1:Enhancements for High Efficiency WLAN, IEEE P802.11axTM/D4.0, Feb. 2019, total:746pages.

(Continued)

*Primary Examiner* — Huy D Vu
*Assistant Examiner* — Robert Ma
(74) *Attorney, Agent, or Firm* — Gregg Jansen

(57) ABSTRACT

Embodiments of this application disclose a communication method and a communication apparatus applied to a wireless communication system, to provide a signaling design solution applicable to a scenario of multi-AP coordinated transmission. An embodiment of this application provides a communication method, including: a first access point (AP) generates notification information, where the notification information indicates a station (STA) that is to send a channel sounding physical layer protocol data unit (PPDU), the notification information includes identification information of the STA and identification information of a second AP, the identification information of the STA indicates the (Continued)

STA, and the identification information of the second AP indicates the second AP. The first AP sends the notification information to the second AP and to the STA.

21 Claims, 19 Drawing Sheets

(56) References Cited

U.S. PATENT DOCUMENTS

| | | | |
|---|---|---|---|
| 2016/0197655 A1* | 7/2016 | Lee | H04W 48/00 370/338 |
| 2017/0079027 A1* | 3/2017 | Chun | H04W 72/51 |
| 2017/0093600 A1 | 3/2017 | Li et al. | |
| 2018/0263044 A1* | 9/2018 | Zhou | H04W 72/12 |
| 2019/0028168 A1* | 1/2019 | Vermani | H04B 7/024 |
| 2020/0007283 A1 | 1/2020 | Chen et al. | |

FOREIGN PATENT DOCUMENTS

| | | |
|---|---|---|
| JP | 2012531793 A | 12/2012 |
| WO | 2010140742 A1 | 12/2010 |
| WO | 2010150950 A1 | 12/2010 |
| WO | 2018169800 A1 | 9/2018 |
| WO | 2019026427 A1 | 2/2019 |

OTHER PUBLICATIONS

IEEE Computer Society et al., Part 11: Wireless LAN Medium Access Control (MAC) and Physical Layer(PHY) Specifications, Amendment 4: Enhancements for Very High Throughput for Operation in Bands below 6 Ghz, IEEE Std 802.11ac 2013, total: 425pages.

Liwen Chu (Marvell), 11az NDP Announcement, IEEE 802.11-17/0474r1, IEEE mentor, Mar. 16, 2017.

Lochan Verma et al., Remaining Issues in Trigger Frame Design, IEEE802.11-16/0611r2, IEEE P802.11 Wireless LANs (released on May 16, 2016), total: 29 pages.

Chao-Chun Wang, Specification Framework for TGaz, IEEE 802.11-15/0132r15, IEEE P802.11 Wireless LANs (released on Apr. 1, 2018), total: 30 pages.

* cited by examiner

| Non-distributed multiple-input multiple-output association identifier (D-MIMO AID) interval that can be used by a basic service set BSS1, ..., and a BSSK | Reserved association identifier (AID) interval | Distributed multiple-input multiple-output association identifier (D-MIMO AID) interval of the BSS1 | ... | Distributed multiple-input multiple-output association identifier (D-MIMO AID) interval of the BSSK |
|---|---|---|---|---|

FIG. 14a

| Non-distributed multiple-input multiple-output association identifier (D-MIMO AID) interval that can be used by a basic service set BSS1, ..., and a BSSK | Reserved association identifier (AID) interval | Distributed multiple-input multiple-output association identifier (D-MIMO AID) interval that can be used by the basic service set BSS1, ..., and the BSSK |
|---|---|---|

FIG. 14c

COMMUNICATION METHOD AND COMMUNICATION APPARATUS APPLIED TO WIRELESS COMMUNICATION SYSTEM

CROSS-REFERENCE TO RELATED APPLICATIONS

This application is a continuation of International Application No. PCT/CN2020/077893, filed on Mar. 5, 2020, which claims priority to Chinese Patent Application No. 201910176456.6, filed on Mar. 8, 2019. The disclosures of the aforementioned applications are hereby incorporated by reference in their entireties.

TECHNICAL FIELD

This application relates to the field of communication technologies, and in particular, to a communication method and a communication apparatus applied to a wireless communication system and access points (APs) of the wireless communication system for performing multi-AP coordinated transmissions.

BACKGROUND

In a current wireless communication system, a larger bandwidth (for example, 320 MHz) and a larger quantity of streams (for example, 16 spatial streams) may be introduced into extremely high throughput (EHT), to improve a throughput and transmission efficiency of the communication system. For example, spatial streams (for example, 16 spatial streams) need to be added in the EHT to improve a throughput capability. However, due to a limited device capability, a single access point (AP) usually cannot provide 16 spatial streams.

In a scenario of multi-AP coordinated transmission, for example, distributed multiple-input multiple-output (D-MIMO) may be used to support a large quantity of spatial streams, thereby improving the throughput and the transmission efficiency. The D-MIMO may also be referred to as joint transmission. A multi-AP coordination or D-MIMO scenario involves channel sounding between a plurality of APs and one station or a plurality of stations (STA). However, the larger bandwidth and the larger quantity of spatial streams may cause overhead of more times of channel sounding, and more channel state feedback information needs to be used. A procedure of channel sounding between the plurality of APs and the one station or the plurality of stations (STA) is time-consuming and complex. Therefore, in the scenario of multi-AP coordinated transmission, how to design proper signaling to coordinate and schedule channel sounding is an unsolved problem.

SUMMARY

Embodiments of this application provide a communication method and a communication apparatus applied to a wireless communication system, to provide a signaling design solution applicable to a scenario of multi-AP coordinated transmission.

To resolve the foregoing technique problem, the embodiments of this application provide the following technical solutions.

According to a first aspect, an embodiment of this application provides a communication method, including: a first access point (AP) generates notification information, where the notification information indicates a station (STA) that is to send a channel sounding physical layer protocol data unit (PPDU), the notification information includes identification information of the STA and identification information of a second AP, the identification information of the STA indicates the STA, and the identification information of the second AP indicates the second AP; and the first AP sends the notification information to the second AP and to the STA.

According to a second aspect, an embodiment of this application further provides a communication method, including: a second access point (AP) receives notification information sent by a first AP, where the notification information indicates a station (STA) that is to send a channel sounding physical layer protocol data unit (PPDU), the notification information includes identification information of the STA and identification information of the second AP, the identification information of the STA indicates the STA, and the identification information of the second AP indicates the second AP; and the second AP determines, based on the identification information of the STA and the identification information of the second AP, that the second AP will receive the channel sounding PPDU sent by the STA.

According to a third aspect, an embodiment of this application provides a communication method, including: a station (STA) receives notification information sent by a first access point (AP), where the notification information indicates the STA that is to send a channel sounding physical layer protocol data unit (PPDU), the notification information includes identification information of the STA and identification information of a second AP, the identification information of the STA indicates the STA, and the identification information of the second AP indicates the second AP; and the STA determines, based on the identification information of the STA and the identification information of the second AP, that the STA will send the channel sounding PPDU.

The method in this embodiment of this application may be applied to a scenario of multi-AP coordinated transmission. In this embodiment of this application, the first AP makes the identification information of the STA and the identification information of the second AP to be carried in the notification information, and the notification information indicates the STA to send the channel sounding physical layer protocol data unit (PPDU). The notification information further indicates the second AP to receive the channel sounding PPDU sent by the STA. The first AP sends the notification information to the second AP and the STA. For example, the first AP sends the notification information in a broadcast manner, so that both the second AP and the STA can receive the notification information. In this embodiment of this application, the first AP sends the notification information for one time, and directly schedules, by using the notification information, the STA to send the channel sounding PPDU, so that the second AP that receives the notification information implements channel sounding. Based on a signaling design solution applicable to the scenario of multi-AP coordinated transmission provided in this embodiment of this application, after receiving the notification information, the STA sends the channel sounding PPDU, and the AP that receives the channel sounding PPDU performs channel estimation based on the channel sounding PPDU, thereby obtaining channel state information. Compared with a common channel sounding procedure, in this embodiment of this application, the AP can implement channel sounding between the plurality of APs and the STA without a plurality of times of scheduling, thereby reducing channel sounding overheads, and improving channel sounding efficiency.

In a possible implementation, the identification information of the STA includes at least one of the following: an association identifier (AID) of the STA or a media access control (MAC) address of the STA. The identification information of the second AP includes at least one of the following: a group identifier corresponding to the second AP, a basic service set color corresponding to the second AP, a group identifier and a basic service set bitmap corresponding to the second AP, an AID of the second AP, or a MAC address of the second AP. Specifically, a set formed by the plurality of APs may be referred to as one AP group, one second AP may be classified into at least one AP group, and a group identifier of an AP group to which the second AP belongs may be used as the identification information of the second AP. The AP group may be a D-MIMO group, and the group identifier of the second AP may be a D-MIMO group identifier of the second AP. Each D-MIMO group includes a secondary AP that belongs to D-MIMO, and different group identifiers may be allocated to different secondary APs. Each secondary AP may be identified based on the group identifier of the secondary AP. For another example, generally, because one basic service set includes one AP, a basic service set color of a basic service set to which the second AP belongs may be used as the identification information of the second AP. For another example, the group identifier and the basic service set bitmap of the second AP may be used as the identification information of the second AP. It is assumed that a preset quantity of secondary APs exist in a D-MIMO group, and a sequence of the secondary APs is known. Therefore, each bit in the bitmap may be corresponding to one secondary AP, to indicate whether the corresponding secondary AP needs to participate in current channel sounding. The secondary AP that needs to participate in current channel sounding may be identified based on the group identifier and the bitmap of the secondary AP. For another example, the AID of the second AP may be used as the identification information of the second AP, and the AID of the second AP may be pre-allocated by the first AP to the second AP. Alternatively, the MAC address of the second AP is used as the identification information of the second AP. A specific implementation form used by the identification information of the second AP is not specifically limited in this embodiment of this application.

In a possible implementation, the notification information is carried in a secondary trigger frame, and the secondary trigger frame includes a common information field and a user information field. The identification information of the second AP is carried in the common information field, and the identification information of the STA is carried in the user information field. In addition to the common information field and the user information field, optionally, the secondary trigger frame may further include another field. The identification information of the second AP in the notification information may be carried in the common information field, and the identification information of the STA in the notification information may be carried in the user information field. The first AP may fill in the user information field with the identification information of the STA that needs to send the channel sounding PPDU. If a plurality of STAs need to send channel sounding PPDUs, the secondary trigger frame may include a plurality of user information fields. The notification information may be carried by using the common information field and the user information field that are included in the secondary trigger frame.

In a possible implementation, the common information field includes a trigger type subfield and a trigger dependent common information subfield. The trigger type subfield indicates a trigger type of the secondary trigger frame. The trigger dependent common information subfield includes the identification information of the second AP. In this embodiment of this application, the trigger type subfield may indicate the type of the secondary trigger frame, and different values of the trigger type subfield may indicate different types of the trigger frame. For example, the trigger type subfield may occupy four bits. When a value of the trigger type subfield is any one of 8 to 15, it may be indicated that the trigger frame is the secondary trigger frame used to carry the notification information. The trigger dependent common information subfield is a subfield in the common information field, and the trigger dependent common information subfield may carry the identification information of the second AP. The identification information of the second AP may be described in a plurality of foregoing examples, and details are not described herein again. The common information field in the secondary trigger frame may carry the identification information of the foregoing second AP. After receiving the secondary trigger frame, the second AP and the STA may determine the type of the secondary trigger frame by using the trigger type subfield in the secondary trigger frame. The identification information of the second AP may be obtained by using the trigger dependent common information subfield.

In a possible implementation, the common information field further includes a secondary trigger frame subtype subfield that indicates a subtype of the secondary trigger frame. The secondary trigger frame subtype subfield belongs to a component part of the common information field, and the secondary trigger frame subtype subfield may specifically be adjacent to the trigger type subfield. For example, the secondary trigger frame subtype subfield indicates the subtype of the secondary trigger frame. For example, when the secondary trigger frame subtype subfield indicates a preset value, it indicates that the secondary trigger frame is a trigger frame used for channel sounding.

In a possible implementation, the common information field further includes the trigger dependent common information subfield. The trigger dependent common information subfield includes a secondary trigger frame subtype subfield and an AP indication subfield. The secondary trigger frame subtype subfield indicates a subtype of the secondary trigger frame. The AP indication subfield includes the identification information of the second AP. The secondary trigger frame subtype subfield may further belong to a component part of the trigger dependent common information subfield, and the type of the secondary trigger frame is indicated by using the secondary trigger frame subtype subfield in the trigger dependent common information subfield. The identification information of the second AP is indicated by using the AP indication subfield in the trigger dependent common information subfield.

In a possible implementation, the notification information is carried in a secondary trigger frame or in a null data packet announcement (NDPA) frame. The secondary trigger frame or the NDPA frame includes a first user information field and a second user information field. The identification information of the second AP is carried in the first user information field. The identification information of the STA is carried in the second user information field. The secondary trigger frame may include the first user information field and the second user information field, and the identification information of the second AP and the identification information of the STA may be indicated by using the two user information fields. If the notification information is carried in the NDPA frame, the first user information field included in the NDPA frame may be a first station information field, and the second user information field included in the NDPA frame may be a second station information field.

In a possible implementation, the first user information field includes an association identifier subfield and an AP indication subfield. The association identifier subfield carries a first value, and the first value is a special AID. The AP indication subfield includes the identification information of the second AP. The association identifier subfield and the AP indication subfield are set in the first user information field, the association identifier (AID) subfield may also be referred to as an AID12 subfield, and the association identifier subfield carries the first value. The first value may be a preset special value. For example, a value of the association identifier subfield may be set to the special AID. For example, the first value may be 4094 or 4095, and the first value may be an AID that is not defined in an existing standard. The first value is used to identify that the first user information field is used to carry the identification information of the second AP. The AP or the STA parses the first user information field, reads the AID12 subfield as the special AID, and determines that the first user information field carries the identification information of the second AP, but does not carry the identification information of the STA.

In a possible implementation, the first user information field is a first transmitted user information field in the secondary trigger frame or in the NDPA frame. The first user information field means that when user information fields are sequentially transmitted according to a transmission sequence, the first user information field is firstly transmitted field. In other words, when the first AP sends the secondary trigger frame or the NDPA frame, according to a transmission sequence, the first user information field is a field that is preferably transmitted. Because the first user information field carries the identification information of the second AP, the second AP first parses the first user information field, the second AP may obtain the identification information of the second AP promptly from the first user information field, and the second AP may prepare in advance to receive the channel sounding PPDU sent by the STA. In this embodiment of this application, the first user information field is first transmitted, so that the second AP may prepare in advance to receive the channel sounding PPDU, thereby avoiding a failure in receiving the PPDU.

According to a fourth aspect, an embodiment of this application further provides a communication method, including: a first access point (AP) generates a secondary trigger frame, where the secondary trigger frame indicates a second AP to perform channel sounding, the secondary trigger frame includes identification information of a station (STA) and identification information of the second AP, the identification information of the STA indicates the STA, and the identification information of the second AP indicates the second AP; and the first AP sends the secondary trigger frame to the second AP.

In a possible design manner of the fourth aspect, the method further includes: The first AP generates a sounding poll frame, where the sounding poll frame indicates the STA to send a channel sounding physical layer protocol data unit (PPDU), and the sounding poll frame includes the identification information of the STA; and the first AP sends the sounding poll frame to the STA.

According to a fifth aspect, an embodiment of this application further provides a communication method, including: a second access point (AP) receives a secondary trigger frame sent by a first AP, where the secondary trigger frame indicates the second AP to perform channel sounding, the secondary trigger frame includes identification information of a station (STA) and identification information of the second AP, the identification information of the STA indicates the STA, and the identification information of the second AP indicates the second AP; the second AP generates a sounding poll frame, where the sounding poll frame indicates the STA to send a channel sounding physical layer protocol data unit (PPDU), and the sounding poll frame includes the identification information of the STA; and the second AP sends the sounding poll frame to the STA.

In a possible design manner of the fifth aspect, the method further includes: The second AP receives the channel sounding PPDU sent by the STA, and performs channel estimation based on the channel sounding PPDU.

According to a sixth aspect, an embodiment of this application further provides a communication method, including: a station (STA) receives a sounding poll frame sent by a second access point (AP), where the sounding poll frame indicates the STA to send a channel sounding physical layer protocol data unit (PPDU), and the sounding poll frame includes identification information of the STA; and the STA determines, based on the identification information of the STA, that the STA needs to send the channel sounding PPDU.

In a possible design manner of the sixth aspect, the method further includes: the STA sends the channel sounding PPDU to the second AP.

In a possible design manner of the sixth aspect, the method further includes: the STA sends the channel sounding PPDU to the first AP.

In a possible design manner of the fourth aspect, the fifth aspect, or the sixth aspect, the identification information of the STA includes at least one of the following: an association identifier (AID) of the STA or a media access control (MAC) address of the STA. The identification information of the second AP includes at least one of the following: a group identifier corresponding to the second AP, a basic service set color corresponding to the second AP, a group identifier and a basic service set bitmap corresponding to the second AP, an AID of the second AP, or a MAC address of the second AP.

In a possible design manner of the fourth aspect, the fifth aspect, or the sixth aspect, the notification information is carried in a secondary trigger frame, and the secondary trigger frame includes a common information field and a user information field. The identification information of the second AP is carried in the common information field, and the identification information of the STA is carried in the user information field.

In a possible design manner of the fourth aspect, the fifth aspect, or the sixth aspect, the common information field includes a trigger type subfield and a trigger dependent common information subfield. The trigger type subfield indicates a trigger type of the secondary trigger frame. The trigger dependent common information subfield includes the identification information of the second AP.

According to a seventh aspect, an AP is provided, configured to perform the method according to any one of the first aspect or the possible implementations of the first aspect. Specifically, the AP includes a unit configured to perform the first aspect or any possible implementation of the first aspect.

In the seventh aspect, an embodiment of this application provides a communication apparatus, where the apparatus is applied to a first access point AP. The communication apparatus includes: a processor, configured to generate notification information, where the notification information indicates a station (STA) to send a channel sounding physical layer protocol data unit (PPDU), the notification information includes identification information of the STA and identification information of a second AP, the identification information of the STA indicates the STA, and the identification information of the second AP indicates the second AP; and a transceiver, configured to send the notification information to the second AP and the STA.

According to an eighth aspect, another AP is provided, configured to perform the method according to any one of the second aspect or the possible implementations of the second aspect. Specifically, the AP includes a unit configured to perform the second aspect or any possible implementation of the second aspect.

In the eighth aspect, an embodiment of this application provides a communication apparatus, where the communication apparatus is applied to a second access point (AP). The communication apparatus includes: a transceiver, configured to receive notification information sent by a first AP, where the notification information indicates a station (STA) to send a channel sounding physical layer protocol data unit (PPDU), the notification information includes identification information of the STA and identification information of the second AP, the identification information of the STA indicates the STA, and the identification information of the second AP indicates the second AP; and a processor, configured to determine, based on the identification information of the STA and the identification information of the second AP, that the second AP needs to receive the channel sounding PPDU sent by the STA.

According to a ninth aspect, a STA is provided, configured to perform the method in any one of the third aspect or the possible implementations of the third aspect. Specifically, the STA includes a unit configured to perform the third aspect or any possible implementation of the third aspect.

In the ninth aspect, an embodiment of this application provides a communication apparatus, where the communication apparatus is applied to a station (STA). The communication apparatus includes: a transceiver, configured to receive notification information sent by a first access point (AP), where the notification information indicates the STA to send a channel sounding physical layer protocol data unit (PPDU), the notification information includes identification information of the STA and identification information of a second AP, the identification information of the STA indicates the STA, and the identification information of the second AP indicates the second AP; and a processor, configured to determine, based on the identification information of the STA and the identification information of the second AP, that the STA needs to send the channel sounding physical layer protocol data unit PPDU.

In a possible implementation, the identification information of the STA includes at least one of the following: an association identifier (AID) of the STA or a media access control (MAC) address of the STA. The identification information of the second AP includes at least one of the following: a group identifier corresponding to the second AP, a basic service set color corresponding to the second AP, a group identifier and a basic service set bitmap corresponding to the second AP, an AID of the second AP, or a MAC address of the second AP.

In a possible implementation, the notification information is carried in a secondary trigger frame, and the secondary trigger frame includes a common information field and a user information field. The identification information of the second AP is carried in the common information field, and the identification information of the STA is carried in the user information field.

In a possible implementation, the common information field includes a trigger type subfield and a trigger dependent common information subfield. The trigger type subfield indicates a trigger type of the secondary trigger frame. The trigger dependent common information subfield includes the identification information of the second AP.

In a possible implementation, the common information field further includes a secondary trigger frame subtype subfield, indicates a subtype of the secondary trigger frame.

In a possible implementation, the common information field further includes the trigger dependent common information subfield. The trigger dependent common information subfield includes a secondary trigger frame subtype subfield and an AP indication subfield. The secondary trigger frame subtype subfield indicates a subtype of the secondary trigger frame. The AP indication subfield includes the identification information of the second AP.

In a possible implementation, the notification information is carried in a secondary trigger frame or a null data packet announcement (NDPA) frame. The secondary trigger frame or the NDPA frame includes a first user information field and a second user information field. The identification information of the second AP is carried in the first user information field. The identification information of the STA is carried in the second user information field.

In a possible implementation, the first user information field includes an association identifier subfield and an AP indication subfield. The association identifier subfield carries a first value, and the first value is a special AID. The AP indication subfield includes the identification information of the second AP.

In a possible implementation, the first user information field is a first transmitted user information field in the secondary trigger frame or the NDPA frame.

According to a tenth aspect, another AP is provided, configured to perform the method according to any one of the fourth aspect or the possible implementations of the fourth aspect. Specifically, the AP includes a unit configured to perform the fourth aspect or any possible implementation of the fourth aspect.

According to an eleventh aspect, another AP is provided, configured to perform the method in any one of the fifth aspect or the possible implementations of the fifth aspect. Specifically, the AP includes a unit configured to perform the fifth aspect or any possible implementation of the fifth aspect.

According to a twelfth aspect, another STA is provided, configured to perform the method in any one of the sixth aspect or the possible implementations of the sixth aspect. Specifically, the STA includes a unit configured to perform the sixth aspect or any possible implementation of the sixth aspect.

According to a thirteenth aspect, an AP is provided. The AP includes a processor and a transceiver, and optionally, further includes a memory. The processor, the transceiver, and the memory communicate with each other through an internal connection. The processor is configured to perform the method according to any one of the first aspect or the possible implementations of the first aspect. The transceiver is configured to receive control of the processor, and configured to perform signal sending and receiving in the method according to any one of the first aspect or the possible implementations of the first aspect. The memory is configured to store instructions, and the instructions are invoked by the processor, to perform the method according to any one of the first aspect or the possible implementations of the first aspect.

According to a fourteenth aspect, an AP is provided. The AP includes a processor and a transceiver, and optionally, further includes a memory. The processor, the transceiver, and the memory communicate with each other through an internal connection. The processor is configured to perform the method according to the second aspect or any possible implementation of the second aspect. The transceiver is configured to receive control of the processor, and configured to perform signal sending and receiving in the method according to the second aspect or any possible implementation of the second aspect. The memory is configured to store instructions, and the instructions are invoked by the processor, to perform the method according to any one of the second aspect or the possible implementations of the second aspect.

According to a fifteenth aspect, a STA is provided. The STA includes a processor and a transceiver, and optionally, further includes a memory. The processor, the transceiver, and the memory communicate with each other through an internal connection. The processor is configured to perform the method according to any one of the third aspect or the possible implementations of the third aspect. The transceiver is configured to receive control of the processor, and configured to perform signal sending and receiving in the method according to any one of the third aspect or the possible implementations of the third aspect. The memory is configured to store instructions, and the instructions are invoked by the processor, to perform the method according to any one of the third aspect or the possible implementations of the third aspect.

According to a sixteenth aspect, an AP is provided. The AP includes a processor and a transceiver, and optionally, further includes a memory. The processor, the transceiver, and the memory communicate with each other through an internal connection. The processor is configured to perform the method according to the fourth aspect or any possible implementation of the fourth aspect. The transceiver is configured to receive control of the processor, and configured to perform signal sending and receiving in the method according to the fourth aspect or any possible implementation of the fourth aspect. The memory is configured to store instructions, and the instructions are invoked by the processor, to perform the method according to any one of the fourth aspect or the possible implementations of the fourth aspect.

According to a seventeenth aspect, an AP is provided. The AP includes a processor and a transceiver, and optionally, further includes a memory. The processor, the transceiver, and the memory communicate with each other through an internal connection. The processor is configured to perform the method according to any one of the fifth aspect or the possible implementations of the fifth aspect. The transceiver is configured to receive control of the processor, and configured to perform signal sending and receiving in the method according to any one of the fifth aspect or the possible implementations of the fifth aspect. The memory is configured to store instructions, and the instructions are invoked by the processor, to perform the method according to any one of the fifth aspect or the possible implementations of the fifth aspect.

According to an eighteenth aspect, a STA is provided. The STA includes a processor and a transceiver, and optionally, further includes a memory. The processor, the transceiver, and the memory communicate with each other through an internal connection. The processor is configured to perform the method according to the sixth aspect or any possible implementation of the sixth aspect. The transceiver is configured to receive control of the processor, and configured to perform signal sending and receiving in the method according to the sixth aspect or any possible implementation of the sixth aspect. The memory is configured to store instructions, and the instructions are invoked by the processor, to perform the method according to any one of the sixth aspect or the possible implementations of the sixth aspect.

According to a nineteenth aspect, a computer-readable storage medium is provided, configured to store a computer program. The computer program includes instructions used to perform the method according to any one of the first aspect or the possible implementations of the first aspect.

According to a twentieth aspect, a computer-readable storage medium is provided, configured to store a computer program. The computer program includes instructions used to perform the method according to any one of the second aspect or the possible implementations of the second aspect.

According to a twenty-first aspect, a computer-readable storage medium is provided, configured to store a computer program, and the computer program includes instructions used to perform the method according to any one of the third aspect or the possible implementation of the third aspect.

According to a twenty-second aspect, a computer-readable storage medium is provided, configured to store a computer program. The computer program includes instructions used to perform the method according to any one of the fourth aspect or the possible implementations of the fourth aspect.

According to a twenty-third aspect, a computer-readable storage medium is provided, configured to store a computer program. The computer program includes instructions used to perform the method according to any one of the fifth aspect or the possible implementations of the fifth aspect.

According to a twenty-fourth aspect, a computer-readable storage medium is provided, configured to store a computer program. The computer program includes instructions used to perform the method according to any one of the sixth aspect or the possible implementations of the sixth aspect.

According to a twenty-fifth aspect, a computer program is provided. The computer program includes instructions used to perform the method according to any one of the first aspect or the possible implementations of the first aspect.

According to a twenty-sixth aspect, a computer program is provided. The computer program includes instructions used to perform the method according to any one of the second aspect or the possible implementations of the second aspect.

According to a twenty-seventh aspect, a computer program is provided. The computer program includes instructions used to perform the method according to any one of the third aspect or the possible implementations of the third aspect.

According to a twenty-eighth aspect, a computer program is provided. The computer program includes instructions used to perform the method according to any one of the fourth aspect or the possible implementations of the fourth aspect.

According to a twenty-ninth aspect, a computer program is provided. The computer program includes instructions used to perform the method according to any one of the fifth aspect or the possible implementations of the fifth aspect.

According to a thirtieth aspect, a computer program is provided. The computer program includes instructions used to perform the method according to any one of the sixth aspect or the possible implementations of the sixth aspect.

According to a thirty-first aspect, a chip is provided. The chip includes a processing circuit and a transceiver pin, and optionally, further includes a memory. The processing circuit, the transceiver pin, and the memory communicate with each other through an internal connection. The processing circuit is configured to perform the method according to any one of the first aspect or the possible implementations of the first aspect. The transceiver pin is configured to receive control of the processing circuit, and configured to perform signal sending and receiving in the method according to any one of the first aspect or the possible implementations of the first aspect. The memory is configured to store instructions, and the instructions are invoked by the processing circuit, to perform the method according to any one of the first aspect or the possible implementations of the first aspect.

According to a thirty-second aspect, a chip is provided. The chip includes a processing circuit and a transceiver pin, and optionally, further includes a memory. The processing circuit, the transceiver pin, and the memory communicate with each other through an internal connection. The processing circuit is configured to perform the method according to the second aspect or any possible implementation of the second aspect. The transceiver pin is configured to receive control of the processing circuit, and configured to perform signal sending and receiving in the method according to the second aspect or any possible implementation of the second aspect. The memory is configured to store instructions, and the instructions are invoked by the processing circuit, to perform the method according to any one of the second aspect or the possible implementations of the second aspect.

According to a thirty-third aspect, a chip is provided. The chip includes a processing circuit and a transceiver pin, and optionally, further includes a memory. The processing circuit, the transceiver pin, and the memory communicate with each other through an internal connection. The processing circuit is configured to perform the method according to any one of the third aspect or the possible implementations of the third aspect. The transceiver pin is configured to receive control of the processing circuit, and configured to perform signal sending and receiving in the method according to any one of the third aspect or the possible implementations of the third aspect. The memory is configured to store instructions, and the instructions are invoked by the processing circuit, to perform the method according to any one of the third aspect or the possible implementations of the third aspect.

According to a thirty-fourth aspect, a chip is provided. The chip includes a processing circuit and a transceiver pin, and optionally, further includes a memory. The processing circuit, the transceiver pin, and the memory communicate with each other through an internal connection. The processing circuit is configured to perform the method according to the fourth aspect or any possible implementation of the fourth aspect. The transceiver pin is configured to receive control of the processing circuit, and configured to perform signal sending and receiving in the method according to the fourth aspect or any possible implementation of the fourth aspect. The memory is configured to store instructions, and the instructions are invoked by the processing circuit, to perform the method according to any one of the fourth aspect or the possible implementations of the fourth aspect.

According to a thirty-fifth aspect, a chip is provided. The chip includes a processing circuit and a transceiver pin, and optionally, further includes a memory. The processing circuit, the transceiver pin, and the memory communicate with each other through an internal connection. The processor circuit is configured to perform the method according to any one of the fifth aspect or the possible implementations of the fifth aspect. The transceiver pin is configured to receive control of the processor circuit, and configured to perform signal sending and receiving in the method according to any one of the fifth aspect or the possible implementations of the fifth aspect. The memory is configured to store instructions, and the instructions are invoked by the processing circuit, to perform the method according to any one of the fifth aspect or the possible implementations of the fifth aspect.

According to a thirty-sixth aspect, a chip is provided. The chip includes a processing circuit and a transceiver pin, and optionally, further includes a memory. The processing circuit, the transceiver pin, and the memory communicate with each other through an internal connection. The processing circuit is configured to perform the method according to the sixth aspect or any possible implementation of the sixth aspect. The transceiver pin is configured to receive control of the processing circuit, and configured to perform signal sending and receiving in the method according to the sixth aspect or any possible implementation of the sixth aspect. The memory is configured to store instructions, and the instructions are invoked by the processing circuit, to perform the method according to any one of the sixth aspect or the possible implementations of the sixth aspect.

BRIEF DESCRIPTION OF DRAWINGS

FIG. 14a is a schematic diagram of an AID allocation situation according to an embodiment of this application;

FIG. 14c is another schematic diagram of an AID allocation situation according to an embodiment of this application;

DESCRIPTION OF EMBODIMENTS

Embodiments of this application provide a communication method and a communication apparatus applied to a wireless communication system, to provide a signaling structure design solution applicable to a scenario of multi-AP coordinated transmission.

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a differentiation manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions in the embodiments of this application may be applied to a communication system, and the communication system may be applied to a scenario of multi-AP coordinated transmission. Multi-AP coordinated transmission may refer to coordinated transmission performed by a plurality of antennas of a plurality of APs, or multi-AP coordinated transmission may also refer to coordinated transmission performed by a plurality of distributed antennas of one AP. For example, a specific implementation scenario of multi-AP coordinated transmission may be D-MIMO transmission. D-MIMO is MIMO in which a transmit end antenna is a distributed antenna, and is generally referred to as coordinated MIMO, or AP joint transmission. The D-MIMO is an implementation of AP coordinated transmission. In the D-MIMO technology, more antennas combined by using a plurality of nodes can be fully utilized, and a higher rate can be provided by using more spatial streams, or a longer transmission distance can be provided by using diversity of channels. Antennas distributed on different nodes provide better antenna isolation, have more independent channels, and can support more spatial streams. For example, the D-MIMO is communication between one or more STAs and an AP group, and the plurality of APs may be connected in a wired or wirelessly manner. For another example, in the D-MIMO, one access controller (AC) may uniformly control the plurality of APs to transmit.

Figure 1:
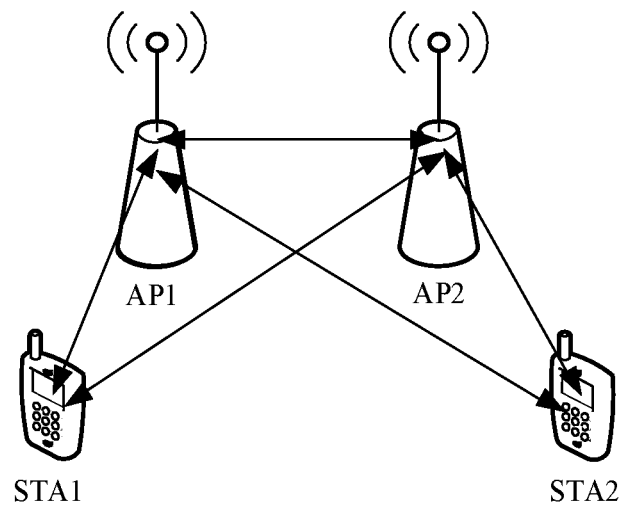
FIG. 1 is a schematic diagram of a composition structure of a communication system according to an embodiment of this application.

As shown in FIG. 1, an example communication system provided in this embodiment of this application may include an AP1, an AP2, a STA1, and a STA2. The AP1 may be a first access point (AP) in this embodiment of this application, and the AP2 may be a second AP provided in this embodiment of this application. The first AP and the second AP may implement multi-AP coordinated transmission or multi-AP joint transmission. The first AP and the second AP each include at least one antenna, and coordinated transmission between the at least one antenna of the first AP and the at least one antenna of the second AP may also be referred to as distributed multiple-input multiple-output (D-MIMO) transmission or coordinated MIMO transmission. For example, the first AP may be a master AP, namely, the AP1 in FIG. 1, the second AP may be a secondary AP, namely, the AP2 in FIG. 1, the first STA may be the STA1 in FIG. 1, and the second STA may be the STA2 in FIG. 1. The first AP may communicate with the second AP, for example, communicate in a wired or wireless manner. In this embodiment of this application, an example in which the first AP is a master AP and the second AP is a secondary AP is used for description. The first AP and the master AP may be alternately used, and the second AP and the secondary AP may be alternately used. It may be understood that a quantity of APs and STAs in the communication system is merely an example.

An access point is a device that connects a station to a communication network in the communication system, for example, may be referred to as a radio access network (RAN) node (or device), a base station, or the like. Currently, some examples of the access point are a transmission reception point (TRP), an evolved NodeB (eNB), a radio network controller (RNC), a NodeB (NB), a base station controller (base station controller, BSC), a base transceiver station (BTS), a home NodeB (for example, a home evolved NodeB, or a home NodeB, HNB), a baseband unit (BBU), a Wi-Fi access point, and another interface device that can work in a wireless environment.

The station is a device that has a wireless connection function and that can provide voice and/or data connectivity for a user, and may also be referred to as a terminal device, user equipment (UE), a mobile station (MS), a mobile terminal (MT), or the like. Currently, some examples of the station include a mobile phone (mobile phone), a tablet computer, a notebook computer, a palmtop computer, a mobile internet device (MID), a wearable device, a virtual reality (VR) device, an augmented reality (AR) device, a wireless terminal in industrial control, a wireless terminal in self driving vehicles, a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a vehicle-mounted device, and the like.

The technical solutions in the embodiments of this application may be applied to various communication systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. The CDMA system may implement wireless technologies such as universal radio terrestrial access (UTRA) and CDMA2000. The UTRA may include a wideband CDMA (WCDMA) technology and other variant technologies of CDMA. The CDMA2000 may cover the interim standard (IS) 2000 (IS-2000), the IS-95 standard, and the IS-856 standard. The TDMA system can implement wireless technologies such as global system for mobile communication (GSM). The OFDMA system can implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and flash OFDMA. The UTRA corresponds to a UMTS, and the E-UTRA corresponds to an evolved version of the UMTS. In 3GPP, long term evolution (LTE) and various versions evolved based on the LTE are new UMTS versions using the E-UTRA. A 5th generation ("5G" for short) communication system or new radio ("NR" for short) is a next generation communication system under study. In addition, the communication system may further be applicable to a future-oriented communication technology, and is applicable to the technical solutions provided in the embodiments of this application. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 2:
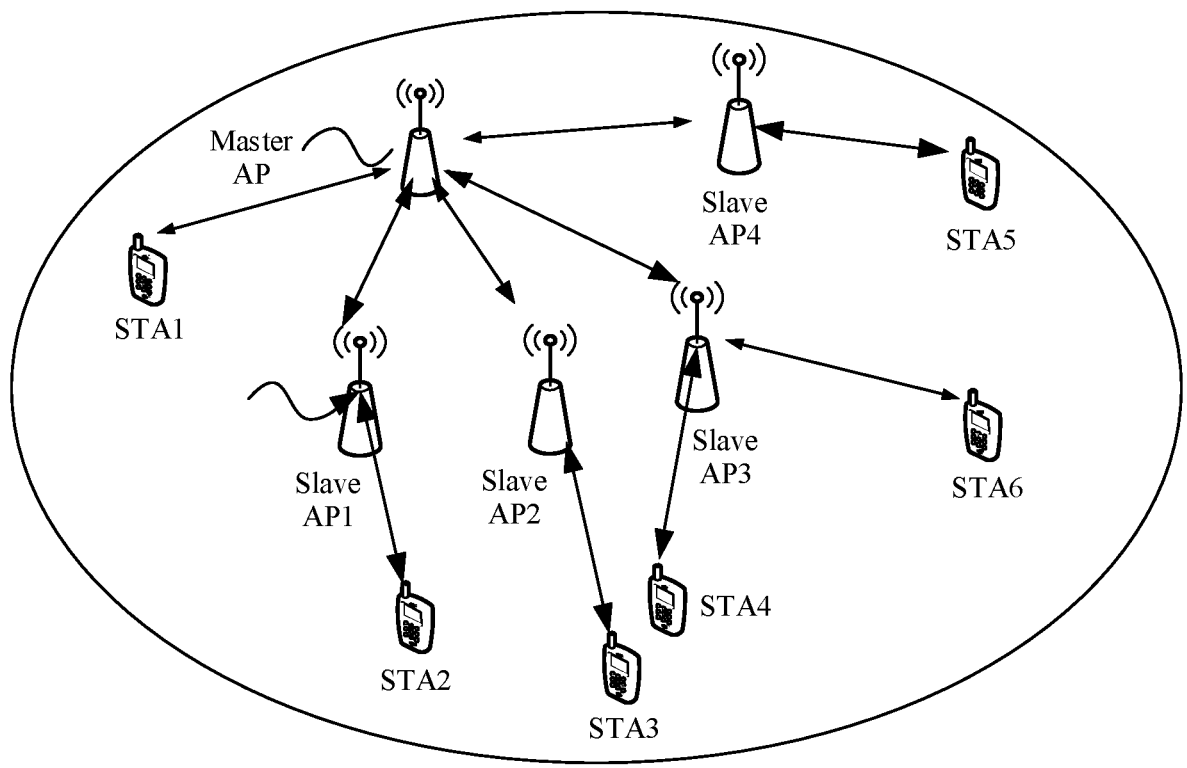
FIG. 2 is a schematic structural diagram of another communication system according to an embodiment of this application.

FIG. 2 is a schematic structural diagram of another communication system according to an embodiment of this application. The communication system shown in FIG. 2 includes a master AP, a secondary APE a secondary AP2, a secondary AP3, a secondary AP4, and STAs 1 to 6. The first AP provided in this embodiment of this application may be the foregoing master AP, and the second AP may be the foregoing secondary APE secondary AP2, secondary AP3, and secondary AP4. The master AP in FIG. 2 may form D-MIMO with the secondary APE the secondary AP2, the secondary AP3, and the secondary AP4, the master AP may form D-MIMO with the secondary APE the secondary AP2, and the secondary AP3, the master AP may form D-MIMO with the secondary AP1 and the secondary AP2, or the master AP may form D-MIMO with the secondary AP1.

The communication system provided in this embodiment of this application may perform communication by using a plurality of Wi-Fi standards, and the plurality of Wi-Fi standards may include an existing high throughput (HT), very high throughput (VHT), a high efficiency (HE) Wi-Fi standard, or a next-generation Wi-Fi standard, for example, extremely high throughput (EHT) or very high efficiency (VHE). In a subsequent embodiment, an example in which the next-generation Wi-Fi standard is the EHT is used to describe the solutions in the embodiments of this application.

The method in this embodiment of this application may be applied to a scenario of multi-AP coordinated transmission. In this embodiment of this application, the first AP makes identification information of the STA and identification information of the second AP to be carried in notification information, and the notification information indicates the STA to send a channel sounding physical layer protocol data unit (PPDU). The notification information further indicates the second AP to receive the channel sounding PPDU sent by the STA. The first AP sends the notification information to the second AP and the STA. For example, the first AP sends the notification information in a broadcast manner, so that both the second AP and the STA can receive the notification information. In this embodiment of this application, the first AP sends the notification information for one time, and directly schedules, by using the notification information, the STA to send the channel sounding PPDU, so that the second AP that receives the notification information implements channel sounding. Based on a signaling design solution applicable to the scenario of multi-AP coordinated transmission provided in this embodiment of this application, after receiving the notification information, the STA sends the channel sounding PPDU, and the AP that receives the channel sounding PPDU performs channel estimation based on the channel sounding PPDU, thereby obtaining channel state information. Compared with a common channel sounding procedure, in this embodiment of this application, the AP can implement channel sounding between a plurality of APs and the STA without a plurality of times of scheduling, thereby reducing channel sounding overheads, and improving channel sounding efficiency.

Figure 3:
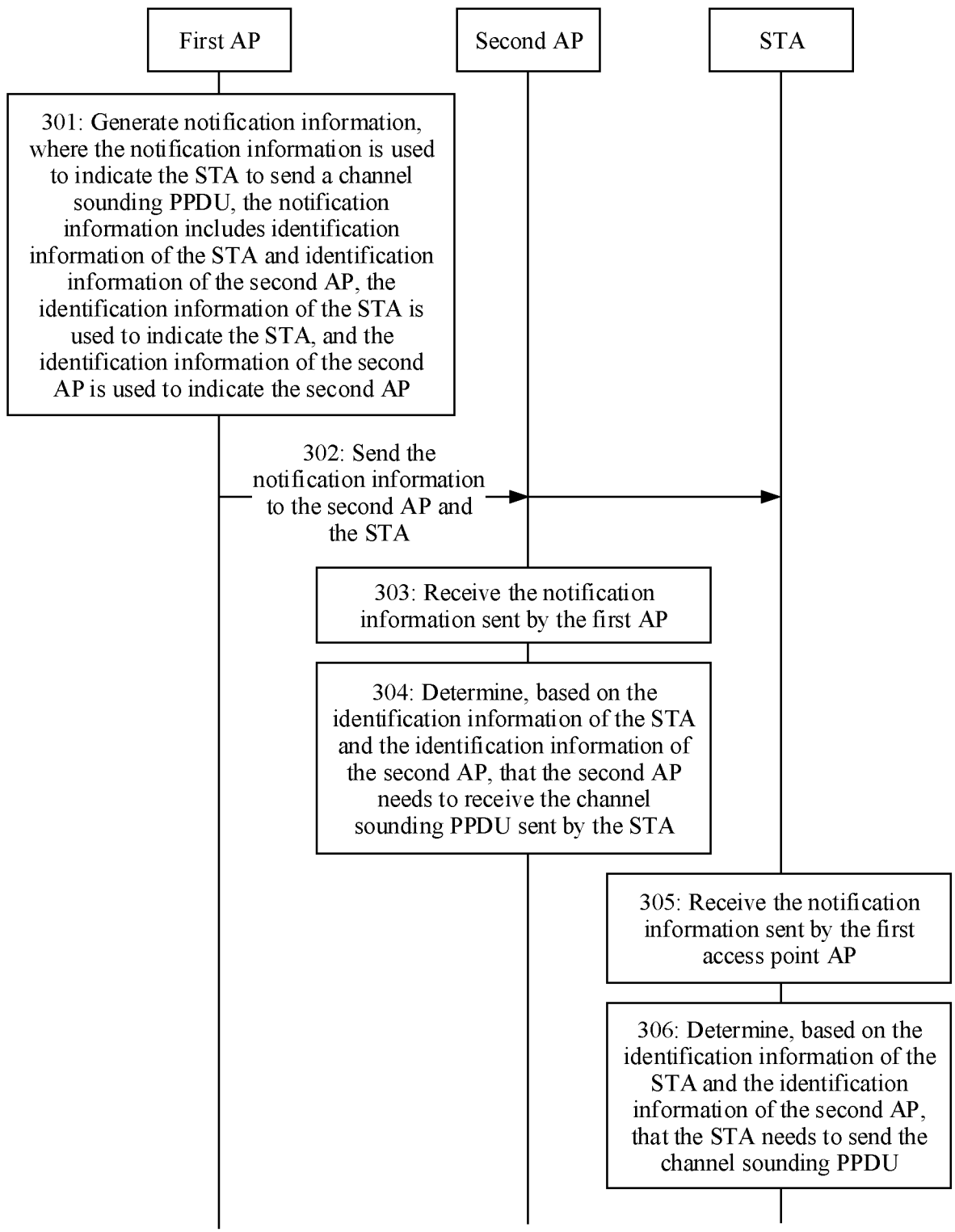
FIG. 3 is a schematic block flowchart of a communication method according to an embodiment of this application.

The following further describes the solutions of the embodiments of this application with reference to more accompanying drawings. FIG. 3 is a schematic flowchart of a communication method according to an embodiment of this application. The communication method provided in this embodiment of this application mainly includes the following steps.

301: A first AP generates notification information, where the notification information indicates a STA to send a channel sounding PPDU, the notification information includes identification information of the STA and identification information of a second AP, the identification information of the STA indicates the STA, and the identification information of the second AP indicates the second AP.

FIG. 2 is used as an example. The first AP may be the master AP in FIG. 2, the second AP may be the secondary AP1, the secondary AP2, and the secondary AP3 in FIG. 2, and the first AP and the second AP may form D-MIMO group. The first AP generates the notification information. The notification information indicates the STA to send the channel sounding PPDU (sounding PPDU), and the notification information may further indicate the second AP to receive the channel sounding physical layer protocol data unit PPDU sent by the STA. The physical layer protocol data unit may also be referred to as a data packet. The channel sounding PPDU is a PPDU used for channel sounding (Sounding). For example, the channel sounding PPDU may specifically be a null data packet (NDP), and the NDP is a data packet that does not include a data field. The NDP may be used to perform channel sounding. It may be understood that the notification information may be sent by any one of a plurality of APs. An example in which the first AP is an AP that sends the notification information is used for description in this embodiment of this application. The first AP may be referred to as a master AP. Another AP, for example, the second AP, is referred to as a secondary AP or a secondary AP.

In this embodiment of this application, to indicate which AP or which APs needs/need to receive the channel sounding PPDU, the first AP makes the identification information of the AP to be carried in the notification information. For example, the first AP indicates the second AP to receive the channel sounding PPDU, and the first AP makes the identification information of the second AP to be carried in the notification information. Similarly, to indicate which STA or STAs needs/need to send the channel sounding PPDU, the first AP makes the identification information of the STA to be carried in the notification information. It should be noted that the notification information may be carried by using a plurality of types of information. For example, the notification information may be existing signaling used for interaction between the first AP and the second AP, or may be signaling newly defined by the first AP. A manner of carrying the notification information and information content included in the notification information are described in detail in subsequent embodiments.

In some embodiments of this application, the identification information of the STA includes at least one of the following: an association identifier (AID) of the STA or a media access control (MAC) address of the STA. Alternatively, some bits of the AID may be used as the identification information of the STA, which is referred to as a partial AID, or some bits of the MAC address may be used as the identification information of the STA, which is referred to as a partial MAC address.

The identification information of the STA has a plurality of implementations. For example, the AID of the STA may be used as the identification information of the STA, and the AID of the STA may be pre-allocated by the first AP to the STA, or the MAC address of the STA is used as the identification information of the STA. A specific implementation form is used for the identification information of the STA. This is not specifically limited in this embodiment of this application.

The identification information of the second AP has a plurality of implementations, and the identification information of the second AP includes at least one of the following: a group identifier (Group ID) corresponding to the second AP, a basic service set color (BSS Color) corresponding to the second AP, a group identifier corresponding to the second AP and a basic service set bitmap (BSS bitmap) corresponding to the second AP, an AID of the second AP, or a MAC address of the second AP.

Specifically, a set formed by the plurality of APs may be referred to as one AP group, one second AP may be classified into at least one AP group, and a group identifier of an AP group to which the second AP belongs may be used as the identification information of the second AP. The AP group may be a D-MIMO group, and the group identifier of the second AP may be a distributed multiple-input multiple-output (D-MIMO) group identifier of the second AP. Each D-MIMO group includes a secondary AP that belongs to D-MIMO, and different group identifiers may be allocated to different secondary APs. Each secondary AP may be identified based on the group identifier of the secondary AP. For another example, generally, because one basic service set includes one AP, a basic service set color of a basic service set to which the second AP belongs may be used as the identification information of the second AP. For another example, the group identifier and the basic service set bitmap of the second AP may be used as the identification information of the second AP. It is assumed that a preset quantity of secondary APs exist in a D-MIMO group, and a sequence of the secondary APs is known. Therefore, each bit in the bitmap may be corresponding to one secondary AP, to indicate whether the corresponding secondary AP needs to participate in current channel sounding. The secondary AP that needs to participate in current channel sounding may be identified based on the group identifier and the bitmap of the secondary AP. For another example, the AID of the second AP may be used as the identification information of the second AP, and the AID of the second AP may be pre-allocated by the first AP to the second AP. Alternatively, the MAC address of the second AP is used as the identification information of the second AP. A specific implementation form used by the identification information of the second AP is not specifically limited in this embodiment of this application.

302: The first AP sends the notification information to the second AP and the STA.

In this embodiment of this application, the first AP may send the notification information to the second AP and the STA. In an example, the notification information may be broadcast or multicast to the second AP and the STA, so that both the second AP and the STA can receive the notification information. In another example, the notification information may be transmitted between the first AP and the STA in a wireless transmission manner, and the notification information may be transmitted between the first AP and the second AP in a wireless transmission manner or wired transmission manner. A specific manner in which the first AP sends the notification information is not limited herein.

303: The second AP receives the notification information sent by the first AP.

The notification information may be transmitted between the first AP and the second AP in a wireless transmission manner or wired transmission manner. The second AP may receive the notification information from the first AP. For information content included in the notification information and a manner of carrying the notification information, refer to descriptions in subsequent embodiments.

After the second AP receives the notification information, the second AP parses the notification information, and obtains the identification information of the STA and the identification information of the second AP from the notification information. For detailed descriptions of the identification information of the STA and the identification information of the second AP, refer to descriptions in subsequent embodiments.

304: The second AP determines, based on the identification information of the STA and the identification information of the second AP, that the second AP needs to receive the channel sounding PPDU sent by the STA.

The first AP is used as a master AP, and the second AP is used as a secondary AP. The notification information sent by the first AP may indicate the second AP to receive the channel sounding PPDU sent by the STA. The second AP may determine, based on the identification (for example, an AID1) information of the STA and the identification information of the second AP that are carried in the notification information, that the second AP needs to receive the channel sounding PPDU sent by the STA whose identifier is the AID1. Specifically, if the identification information of the second AP carried in the notification information indicates the second AP, it may be determined that the second AP needs to receive the channel sounding PPDU sent by the STA.

305: The STA receives the notification information sent by the first access point AP.

In this embodiment of this application, the notification information may be transmitted between the first AP and the STA in a wireless transmission manner, and the STA may receive the notification information from the first AP. For information content included in the notification information and a manner of carrying the notification information, refer to descriptions in the foregoing embodiments. Details are not described herein again.

In this embodiment of this application, after the STA receives the notification information, the STA parses the notification information, and obtains the identification information of the STA and the identification information of the second AP from the notification information. For detailed descriptions of the identification information of the STA and the identification information of the second AP, refer to descriptions in subsequent embodiments.

306: The STA determines, based on the identification information of the STA and the identification information of the second AP, that the STA needs to send the channel sounding PPDU.

In some embodiments of this application, after determining, based on the identification (for example, an AID1) information of the STA and the identification information of the second AP that are carried in the notification information, that the STA needs to send the channel sounding PPDU, the STA performs the following step 309 (not schematically described in FIG. 3). Optionally, the STA may further send the channel sounding PPDU after one short frame space.

Optionally, after step 306, the second AP may further perform the following step 307 (not schematically described in FIG. 3).

The second AP receives the channel sounding PPDU sent by the STA, and then performs channel estimation.

In this embodiment of this application, the first AP directly schedules the STA to send the channel sounding PPDU. The first AP needs to send the notification information for only one time, and can coordinate and schedule the second AP and the STA to perform different procedures based on the notification information, to implement channel sounding. Therefore, channel sounding overheads can be reduced.

Optionally, after step 306, the first AP may further perform the following step 308 (not schematically described in FIG. 3).

The first AP receives the channel sounding PPDU sent by the STA, and then performs channel estimation.

In this embodiment of this application, the first AP directly schedules the STA to send the channel sounding PPDU. The first AP needs to send the notification information for only one time, and the second AP and the STA can perform different procedures based on the notification information. Therefore, channel sounding overheads can be reduced.

Generally, an explicit channel sounding manner is used for multi-AP coordinated transmission. To be specific, an initiator (for example, the AP) of channel sounding sends the NDP to a responder (the STA) of channel sounding, and the STA actually measures a downlink channel from the AP to the STA, and feeds back a measured channel detection result to the AP. The feedback channel measurement result includes a downlink channel measurement result between the STA and a plurality of secondary APs. Therefore, feedback overheads are relatively large.

In this embodiment of this application, an implicit channel sounding manner is used for multi-AP coordinated transmission. To be specific, the AP schedules the STA to send the NDP, the STA sends the NDP to the AP, the AP measures an uplink channel from the STA to the AP, and the AP uses channel dissimilarity, to obtain a channel measurement result of a downlink channel from the AP to the STA. The AP is an obtainer of the channel measurement result, and does not need to feed back the channel measurement result over an air interface. Therefore, overheads of feeding back the channel measurement result are reduced, and a system throughput is improved.

The notification information may be carried in a plurality of manners. A manner of carrying the notification information is described in detail below.

In some embodiments of this application, for example, the notification information is carried in a trigger frame, and the trigger frame may also be referred to as a secondary trigger frame (secondary TF), or the notification information may be carried in a null data packet announcement (In the NDPA) frame, or the notification information may be signaling newly defined by the first AP. The following first uses an example in which the notification information is carried in the secondary trigger frame for description.

Figure 4:
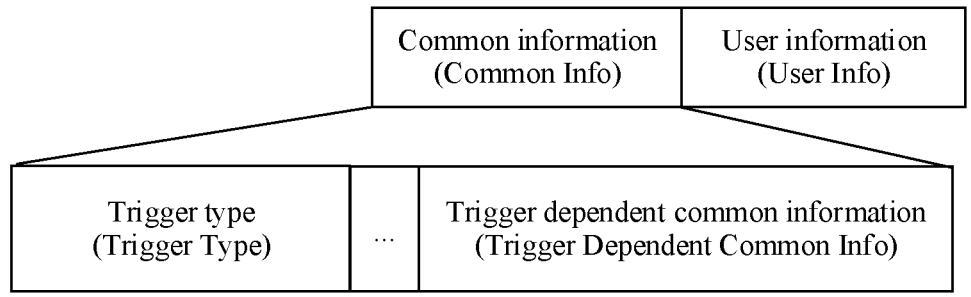
FIG. 4 is a schematic diagram of a composition structure of a secondary trigger frame according to an embodiment of this application.

In some embodiments of this application, FIG. 4 is a schematic diagram of a composition structure of a secondary trigger frame according to an embodiment of this application. The notification information is carried in a secondary trigger frame, and the secondary trigger frame includes a common information (Common Info) field and a user information (User Info) field. The identification information of the second AP is carried in the common information field, and the identification information of the STA is carried in the user information field.

FIG. 4 shows only some component fields of the secondary trigger frame. In addition to the common information field and the user information field, optionally, the secondary trigger frame may further include another field, which is not shown in FIG. 4 herein. The identification information of the second AP in the notification information may be carried in the common information field, and the identification information of the STA in the notification information may be carried in the user information field. The first AP may fill in the user information field with the identification information of the STA that needs to send the channel sounding PPDU. If a plurality of STAs need to send channel sounding PPDUs, the secondary trigger frame may include a plurality of user information fields. The notification information may be carried by using the common information field and the user information field that are included in the secondary trigger frame.

As shown in FIG. 4, the common information field includes a trigger type (Trigger Type) subfield and a trigger dependent common information (Trigger Dependent Common Info) subfield. The trigger type subfield indicates a trigger type of the secondary trigger frame. The trigger dependent common information subfield includes the identification information of the second AP.

The trigger type subfield may indicate the type of the secondary trigger frame, and different values of the trigger type subfield may indicate different types of the trigger frame. For example, the trigger type subfield may occupy four bits. When a value of the trigger type subfield is any one of 8 to 15, it may be indicated that the trigger frame is the secondary trigger frame used to carry the notification information. The trigger dependent common information subfield is a subfield in the common information field, and the trigger dependent common information subfield may carry the identification information of the second AP. The identification information of the second AP may be described in a plurality of foregoing examples, and details are not described herein again. The common information field in the secondary trigger frame may carry the identification information of the foregoing second AP. After receiving the secondary trigger frame, the second AP and the STA may determine the type of the secondary trigger frame by using the trigger type subfield in the secondary trigger frame. The identification information of the second AP may be obtained by using the trigger dependent common information subfield.

In some embodiments of this application, the first AP may further indicate the type of the secondary trigger frame. For example, the first AP sets a secondary trigger frame subtype subfield in the secondary trigger frame, to indicate that the secondary trigger frame is a trigger frame used to trigger the STA to send the channel sounding PPDU. In this embodiment of this application, the first AP indicates the STA to send the channel sounding PPDU, and the second AP or the first AP receives the channel sounding PPDU, to implement channel estimation. The notification information in this embodiment of this application may not only notify the STA to send the channel sounding PPDU, but also may indicate the AP to prepare to receive the channel sounding PPDU, thereby improving channel detection efficiency.

Figure 5:
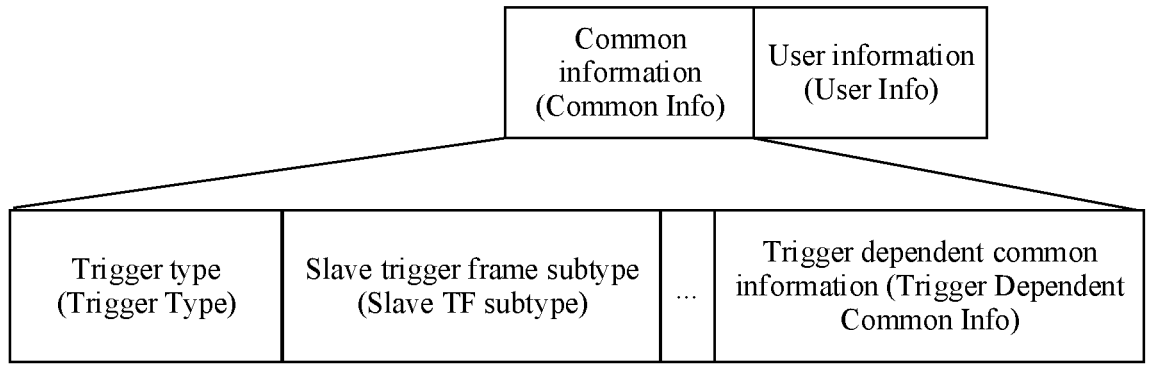
FIG. 5 is a schematic diagram of a composition structure of another secondary trigger frame according to an embodiment of this application.

FIG. 5 is a schematic diagram of a composition structure of another secondary trigger frame according to an embodiment of this application. The common information field further includes a secondary trigger frame subtype subfield, indicates a subtype of the secondary trigger frame. The secondary trigger frame subtype subfield belongs to a component part of the common information field, and the secondary trigger frame subtype subfield may specifically be adjacent to the trigger type subfield. For example, the secondary trigger frame subtype subfield indicates the subtype of the secondary trigger frame. For example, when the secondary trigger frame subtype subfield indicates a preset value, it indicates that the secondary trigger frame is a trigger frame used for channel sounding.

Figure 6:
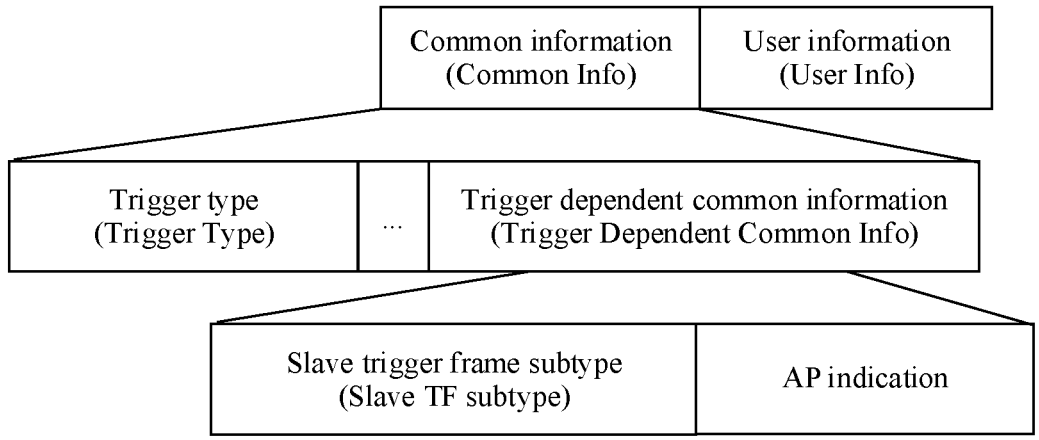
FIG. 6 is a schematic diagram of a composition structure of another secondary trigger frame according to an embodiment of this application.

FIG. 6 is a schematic diagram of a composition structure of another secondary trigger frame according to an embodiment of this application. The common information field further includes the trigger dependent common information subfield. The trigger dependent common information subfield includes a secondary trigger frame subtype subfield and an AP indication subfield. The secondary trigger frame subtype subfield indicates a subtype of the secondary trigger frame. The AP indication subfield includes the identification information of the second AP. The secondary trigger frame subtype subfield may further belong to a component part of the trigger dependent common information subfield, and the type of the secondary trigger frame is indicated by using the secondary trigger frame subtype subfield in the trigger dependent common information subfield. The identification information of the second AP is indicated by using the AP indication subfield in the trigger dependent common information subfield. The identification information of the second AP may be described in a plurality of foregoing examples, and details are not described herein again.

Figure 7:
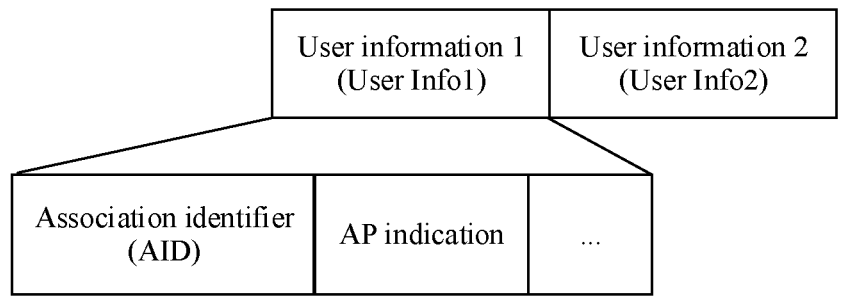
FIG. 7 is a schematic diagram of a composition structure of another secondary trigger frame according to an embodiment of this application.

In some embodiments of this application, the notification information is carried in the secondary trigger frame or the NDPA frame. FIG. 7 is a schematic diagram of a composition structure of a secondary trigger frame according to an embodiment of this application. The notification information is carried in the secondary trigger frame or the NDPA frame. The secondary trigger frame or the NDPA frame may include a first user information field and a second user information field. An example in which the secondary trigger frame includes the user information 1 and the user information 2 is used for description in FIG. 7. The first user information field may refer to the user information 1. The second user field may refer to the user information 2. If the notification information is carried in the NDPA frame, the first user information field included in the NDPA frame may be a first station (STA) information field, and the second user information field included in the NDPA frame may be a second station information field.

Specifically, the identification information of the second AP is carried in the first user information field, and the identification information of the STA is carried in the second user information field. The first AP may make the identification information of the second AP to be carried in the first user information field, and the first AP may fill the second user information field with the identification information of the STA that needs to send the channel sounding PPDU. If a plurality of STAs need to send the channel sounding PPDU, the secondary trigger frame may include a plurality of second user information fields. The notification information may be carried by using the plurality of user information fields included in the secondary trigger frame.

As shown in FIG. 7, the first user information field includes an association identifier subfield and an AP indication subfield. The association identifier subfield carries a first value. The AP indication subfield includes the identification information of the second AP.

The association identifier subfield and the AP indication subfield are set in the first user information field, the association identifier (AID) subfield may also be referred to as an AID12 subfield, and the association identifier subfield carries the first value. The first value may be a preset special value. For example, a value of the association identifier subfield may be set to a special AID. For example, the first value may be 4094 or 4095, and the first value may be an AID that is not defined in an existing standard. The first value is used to identify that the first user information field is used to carry the identification information of the second AP. The AP or the STA parses the first user information field, reads the AID12 subfield as the special AID, and determines that the first user information field carries the identification information of the second AP, but does not carry the identification information of the STA.

In the first user information field, the association identifier subfield may be transmitted before the AP indication subfield, so that a receive end that receives the first user information field may first obtain the association identifier subfield, continue to receive the AP indication subfield based on the first value carried in the association identifier subfield, and obtain the identification information of the second AP by using the AP indication subfield.

In some embodiments of this application, the first user information field is a first transmitted user information field in the secondary trigger frame or the NDPA frame.

That the user information field is first transmitted means that when user information fields are sequentially transmitted according to a transmission sequence, the first user information field may be the first transmitted field. In other words, when the first AP sends the secondary trigger frame or the NDPA frame, according to a transmission sequence, the first user information field is a field that is preferably transmitted. Because the first user information field carries the identification information of the second AP, the second AP first parses the first user information field, the second AP may obtain the identification information of the second AP promptly from the first user information field, and the second AP may prepare in advance to receive the channel sounding PPDU sent by the STA. In this embodiment of this application, the first user information field is first transmitted, so that the second AP may prepare in advance to receive the channel sounding PPDU, thereby avoiding a failure in receiving the PPDU.

It can be learned from the foregoing description of this embodiment of this application that, in this embodiment of this application, the first AP sends the notification information for one time, and directly schedules, by using the notification information, the STA to send the channel sounding PPDU, so that the second AP that receives the notification information implements channel sounding. Based on a signaling design solution applicable to the scenario of multi-AP coordinated transmission provided in this embodiment of this application, after receiving the notification information, the STA may further send the channel sounding PPDU, and the AP that receives the channel sounding PPDU performs channel estimation based on the channel sounding PPDU, thereby obtaining channel state information. Compared with a common channel sounding procedure, in this embodiment of this application, the AP can implement channel sounding between the AP and the STA without a plurality of times of scheduling, thereby reducing channel sounding overheads, and improving channel sounding efficiency.

Figure 8:
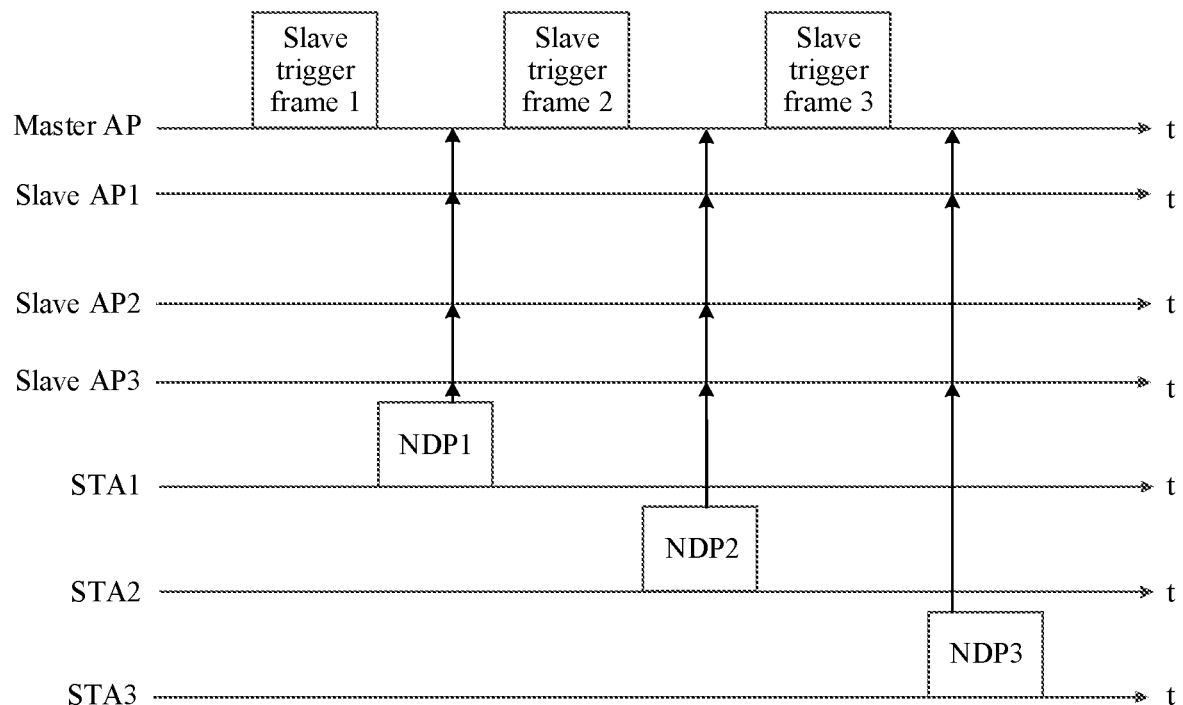
FIG. 8 is a schematic flowchart in which a master AP directly schedules a STA to send an NDP according to an embodiment of this application.

With reference to FIG. 2, a scenario in which one master AP (the first AP) and three secondary (secondary) APs (the second APs) are included is used as an example to describe a procedure of the communication method in this embodiment of this application. FIG. 8 is a schematic flowchart in which a master AP (master AP) directly schedules a STA to send an NDP according to an embodiment of this application. The master AP directly schedules the STA to send the NDP, to implement an implicit channel sounding procedure. The procedure mainly includes the following steps:

S01: A master AP sends a secondary trigger frame 1 (secondary TF), and one or more STAs may be scheduled to send an NDP by using the secondary trigger frame.

The secondary TF includes identification information of the STA, and is used to trigger the STA to send the NDP. The secondary TF further includes identification information of a secondary AP, and is used to notify the secondary AP to prepare to receive the NDP sent by the STA. For example, the master AP may send the secondary trigger frame 1, a secondary trigger frame 2, and a secondary trigger frame 3. The secondary trigger frame 1 is used to trigger a STA1 to send an NDP1, the secondary trigger frame 2 is used to trigger a STA2 to send an NDP2, and the secondary trigger frame 3 is used to trigger a STA3 to send an NDP3.

S02: The secondary AP receives the secondary TF, and prepares to receive the NDP.

S03: After receiving the secondary TF, the STA sends the NDP.

S04: The secondary AP receives the NDP, and performs channel estimation. Optionally, the master AP receives the NDP, and performs channel estimation.

As shown in FIG. 8, the master AP may schedule one STA to send the NDP for one time, or may schedule a plurality of STAs to send NDPs in parallel by using an uplink orthogonal frequency division multiple access (UL OFDMA) technology or a multi-user multiple-input multiple-output (UL MU-MIMO) technology. In addition, the master AP may further schedule, in a time division manner, a plurality of STAs for one time to sequentially send NDPs in a time sequence. For example, based on FIG. 8, the master AP may send the secondary TF for only one time, namely, the secondary trigger frame 1, but does not send the two subsequent secondary TFs. The secondary trigger frame 1 triggers the STA1, the STA2, and the STA3 sequentially to send three adjacent NDPs. An inter-frame space between adjacent NDPs is fixed, for example, a short inter-frame space (SIFS).

The following describes a corresponding frame structure design manner with reference to the foregoing procedure from S01 to step S04. First, a design of a frame structure of the secondary TF is described. The following describes several different design methods of the frame structure of the secondary TF. For ease of description, the common information field is abbreviated as common information, and the user information field is abbreviated as user information in the composition structure of the secondary TF. English uppercase and English lowercase meanings in field names are the same. For example, Trigger Type and trigger type indicate same meanings. Similar abbreviations are also used for other fields in the composition structure of the secondary TF, and are not described one by one.

Figure 9A:
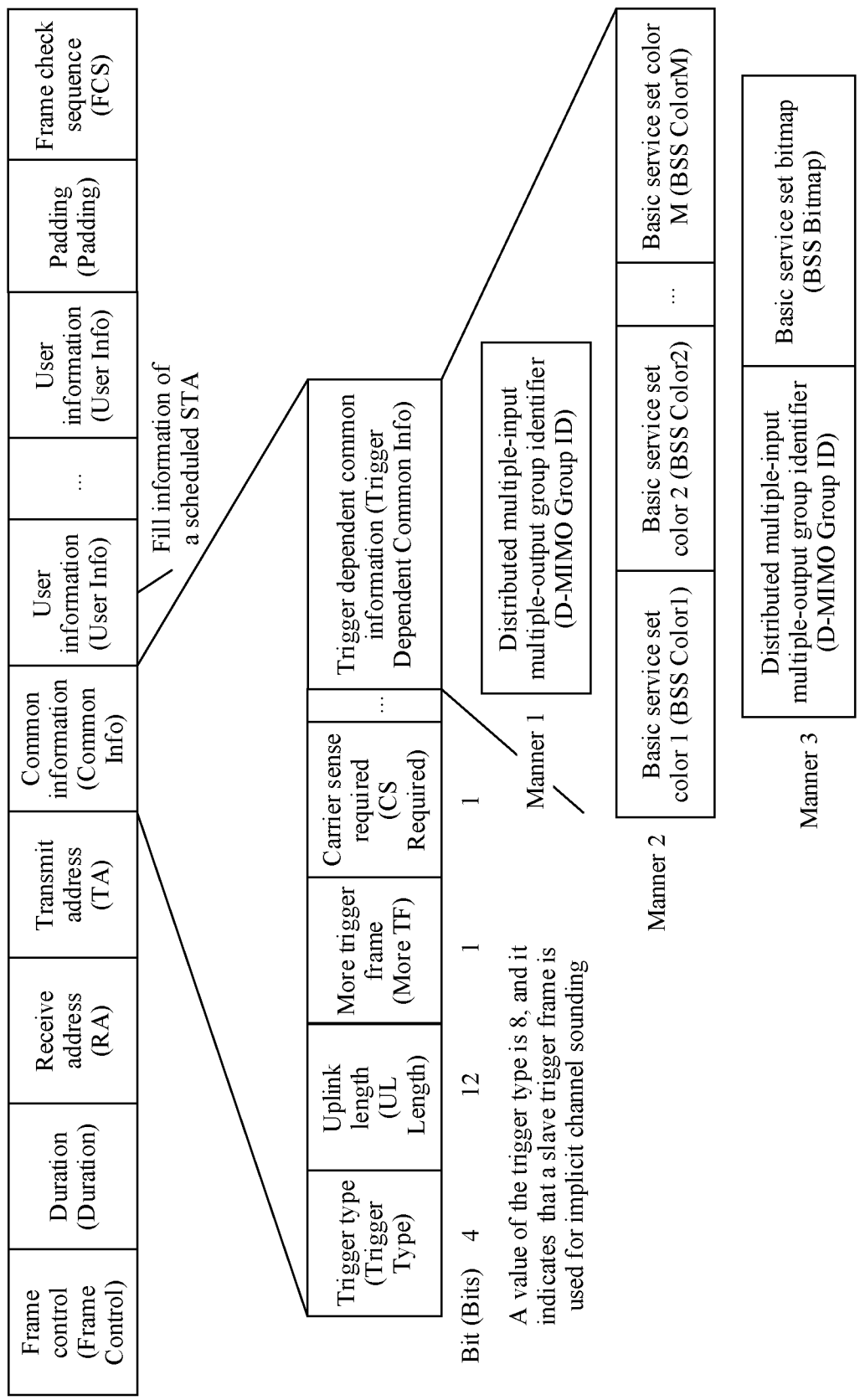
FIG. 9a is a schematic diagram of a composition structure of another secondary trigger frame according to an embodiment of this application.

As shown in FIG. 9a, in a first frame structure of the secondary TF, a composition structure of the following fields is mainly included: a frame control (Frame Control) field, a duration (Duration) field, a receive address (RA) field, a transmit address (TA) field, a common information (Common Info) field, a user information (User Info) field, a padding (Padding) field, and a frame check sequence (FCS) field.

The common information field may include fields such as a trigger type (Trigger Type) field, an uplink length (UL Length) field, a more trigger frame (More TF) field, a carrier sense required (CS Required) field, and a trigger dependent common information (Trigger Dependent Common Info) field.

The trigger type field occupies four bits, and a value of the trigger type field is 8. It indicates that the secondary trigger frame is used for implicit channel sounding. What is not limited is that the value of the trigger type field may alternatively be 9 or another value. The uplink length field occupies 12 bits, the more trigger frame field occupies one bit, and the carrier sense required field occupies one bit.

The trigger dependent common information field may be used to carry (including but being not limited to) one of the following three implementations:
  manner 1: distributed multiple-input multiple-output group identifier (D-MIMO Group ID);
  manner 2: basic service set color 1 (BSS Color1), basic service set color 2 (BSS Color2), and basic service set color M (BSS ColorM); and
  manner 3: distributed multiple-input multiple-output group identifier (D-MIMO Group ID) and basic service set bitmap (BSS Bitmap).

In this embodiment of this application, a new trigger frame variant type is defined. The trigger type field of the current trigger frame has 4 bits in total, and 16 different types of trigger frames may be defined. As shown in FIG. 9a, in this embodiment of this application, the value of the trigger type field may be defined as one of 8 to 15 (for example, 9), to indicate that the trigger frame is the secondary TF, indicate that the trigger frame is a TF used for implicit channel sounding, or indicate a secondary TF used for implicit channel sounding. Information about the secondary AP that participates in channel sounding may be indicated in the common information field in the trigger frame, for example, the trigger dependent common information (trigger dependent common info) field. The information about the secondary AP is, for example, a D-MIMO group, indicates group identification information (GID) of D-MIMO; or a BSS color of each secondary AP that participates in current channel sounding, where the BSS is a cell in which an AP is located, and the BSS color is identification information of the cell; or a BSS identifier (BSSID), an APID, or an association identifier (AID) independently allocated by the master AP to the secondary AP; or a combination of the D-MIMO GID and a BSS bitmap (BSS bitmap), used to specifically indicate which secondary APs, in the current D-MIMO group, that participate in current channel sounding. In addition, one or more user information fields include identification information of a STA that needs to send an NDP, and the identification information of the STA includes an AID of the STA, and the like.

Figure 9B:
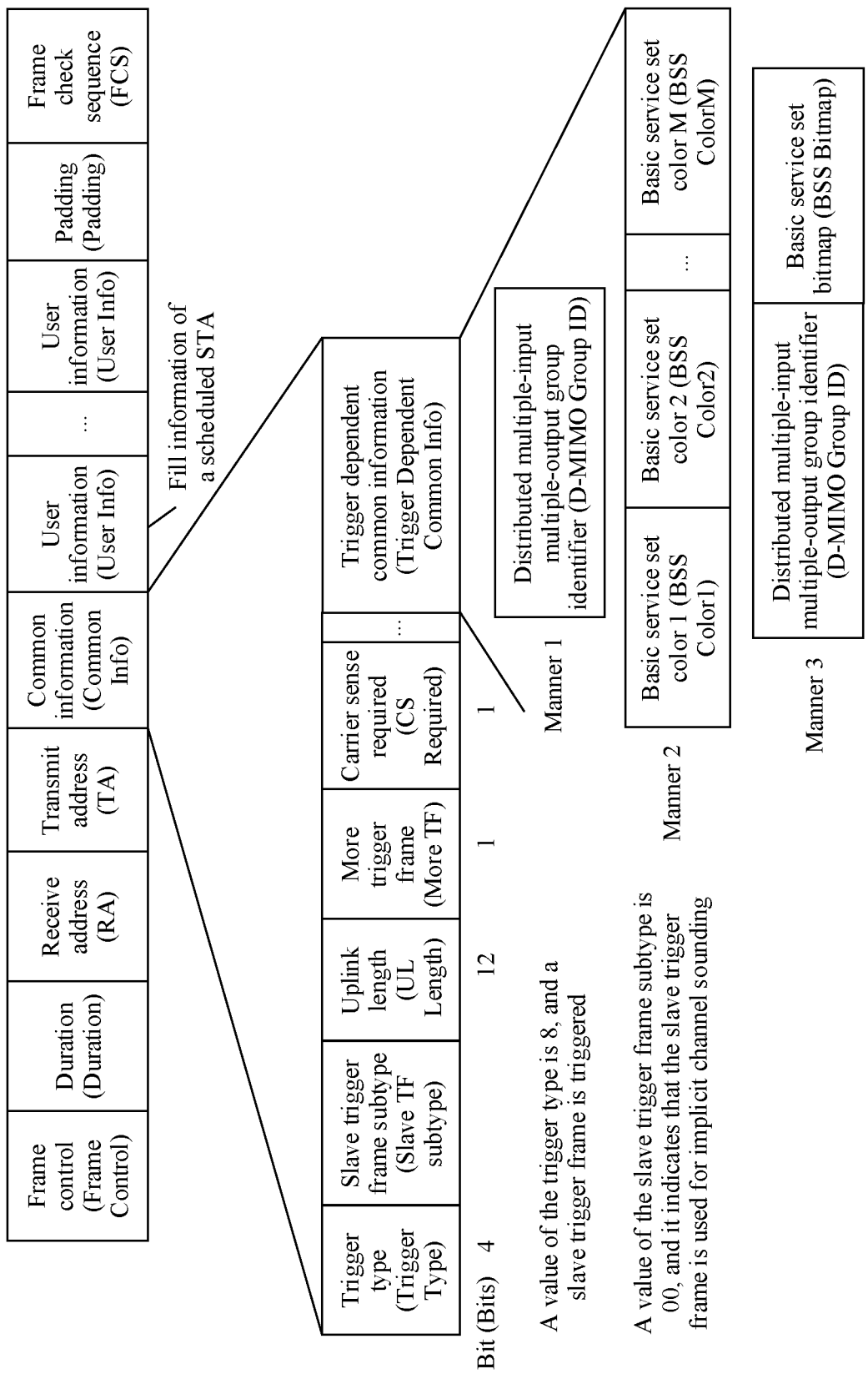
FIG. 9b is a schematic diagram of a composition structure of another secondary trigger frame according to an embodiment of this application.

As shown in FIG. 9b, in a second frame structure of the secondary TF, the second frame structure of the secondary TF is similar to the first frame structure of the secondary TF, and a difference lies in a different method for indicating that the frame is the secondary TF used for implicit channel sounding. First, the trigger frame indicates that a type of the trigger frame is the secondary TF. Then, a secondary trigger frame subtype (secondary TF subtype) field further indicates that the subtype is the secondary TF used for implicit channel sounding. A value of the trigger type field is 8, and the secondary trigger frame is indicated. The value of the trigger type field may alternatively be 9 or another value. A value of the secondary trigger frame subtype field is 00. It indicates that the secondary trigger frame is used for implicit channel sounding. For example, as shown in FIG. 9b, the secondary TF subtype field may follow the trigger type field. What is not limited is that, in some other embodiments of this application, the secondary TF subtype field may alternatively be located in the trigger dependent common Info.

Figure 9C:
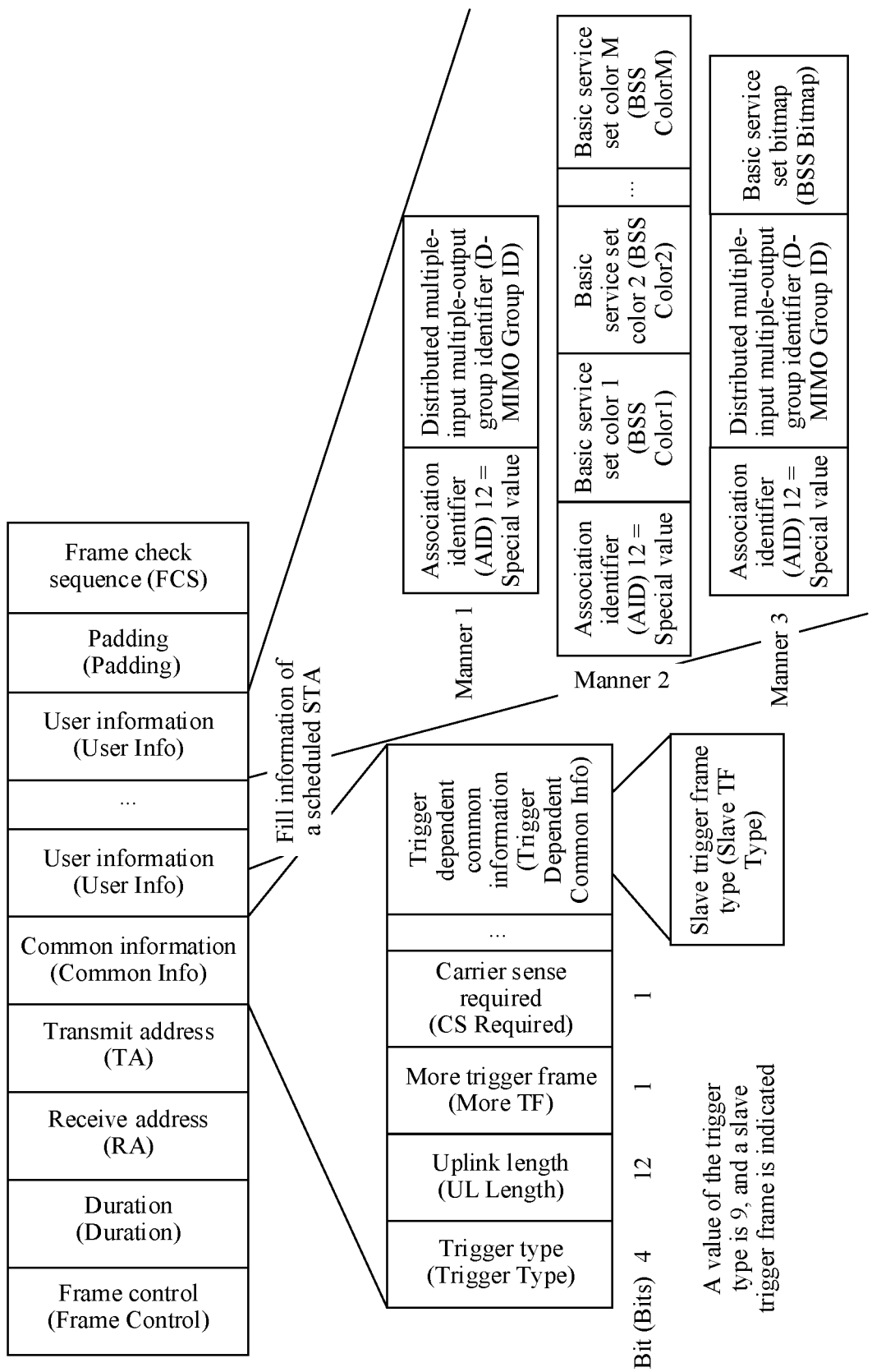
FIG. 9c is a schematic diagram of a composition structure of another secondary trigger frame according to an embodiment of this application.

As shown in FIG. 9c, in a third frame structure of the secondary TF, the following fields are included: a frame control (Frame Control) field, a duration (Duration) field, a receive address (RA) field, a transmit address (TA) field, a common information (Common Info) field, a plurality of user information (User Info) fields, a padding (Padding) field, and a frame check sequence (FCS) field.

The common information field may include the following fields: a trigger type (Trigger Type) field, an uplink length (UL Length) field, a more trigger frame (More TF) field, a carrier sense required (CS Required) field, and a trigger dependent common information (Trigger Dependent Common Info) field. The trigger type field occupies a plurality of bits, for example, four bits, and a value of the trigger type field is 9. It indicates that the trigger frame is the secondary trigger frame. What is not limited is that the value of the trigger type field may alternatively be 10 or another value. The uplink length field occupies 12 bits, the more trigger frame field occupies one bit, and the carrier sense required field occupies one bit. The trigger dependent common information field includes a secondary trigger frame type (Secondary TF Type). The secondary trigger frame subtype field indicates a subtype of the secondary trigger frame, and the secondary trigger frame is a trigger frame used to trigger the STA to send the channel sounding PPDU.

One user information field may carry information about a scheduled STA. Another user information field may be used to carry one of the following three implementations:
manner 1: distributed multiple-input multiple-output group identifier (D-MIMO Group ID);
manner 2: basic service set color 1 (BSS Color1), basic service set color 2 (BSS Color2), and basic service set color M (BSS ColorM); and
manner 3: distributed multiple-input multiple-output group identifier (D-MIMO Group ID) and basic service set bitmap (BSS Bitmap).

For detailed description of FIG. 9c, the identification information of the secondary AP is carried in a user info, each user information field includes an AID subfield, and a value of the AID subfield may be set to a special AID. The special AID may be an AID not defined in an existing standard, or may be an unallocated AID, for example, 4094 or 4095, and is used to identify that the user info is used to carry the identification information of the secondary AP.

After finding that an AID12 is a special value, the STA no longer determines, in a common user info interpretation manner, that the user info field carries the identification information of the secondary AP.

Figure 9D:
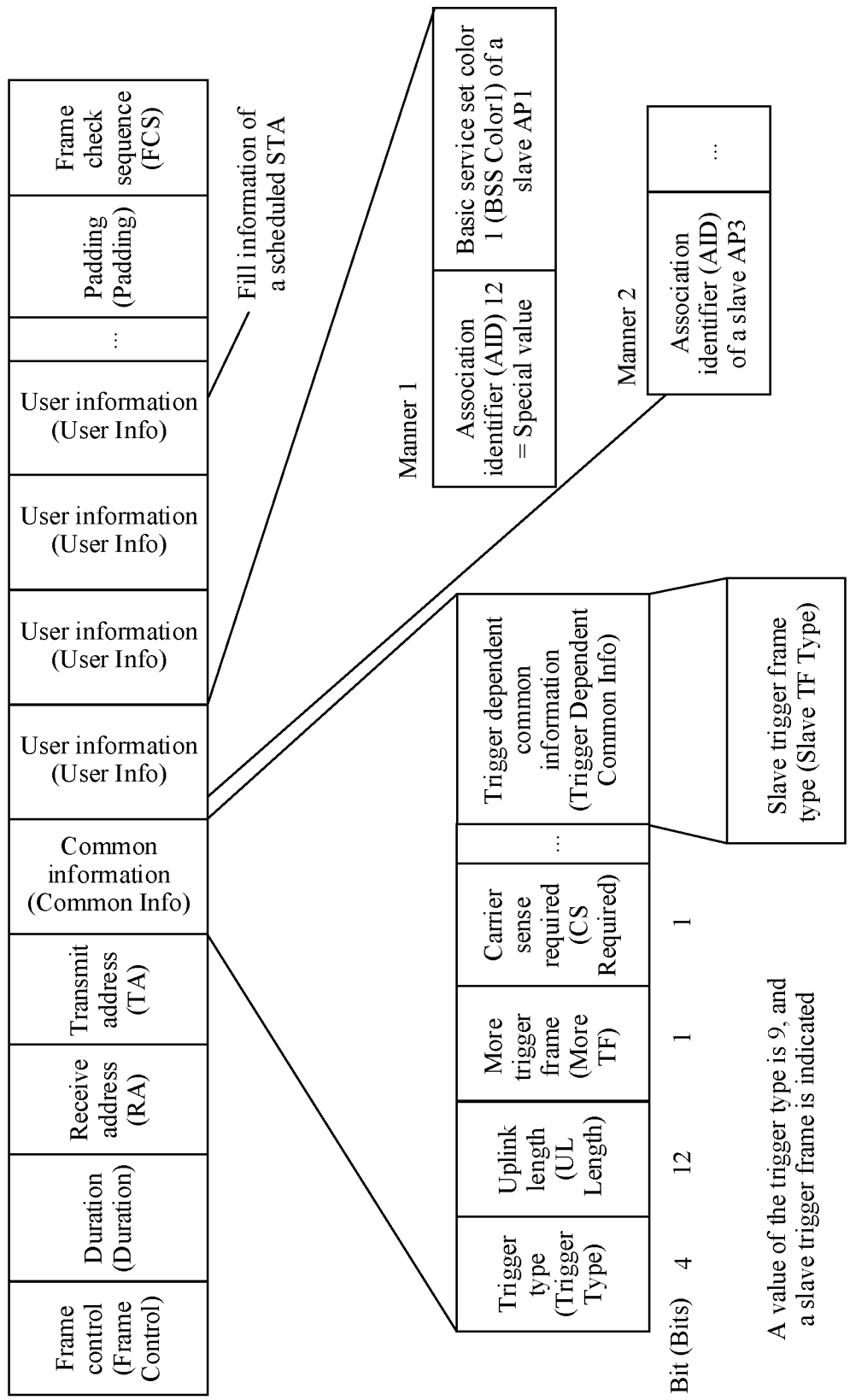
FIG. 9d is a schematic diagram of a composition structure of another secondary trigger frame according to an embodiment of this application.

FIG. 9d shows an example of a fourth frame structure of the secondary TF, which is similar to the foregoing third frame structure of the secondary TF. A difference lies in that the secondary TF in the fourth frame structure flexibly uses one user information field to indicate the identification information of the secondary AP. In an example, an AID12 field of a user info indicates a special AID, and a field following the AID12 field carries identification information of a secondary AP, where the identification information may be a BSS color of a BSS to which the secondary AP belongs. In another example, an AID12 field of a user info is an AID allocated by the master AP to the secondary AP. An advantage of the fourth frame structure of the secondary TF compared with the third frame structure of the secondary TF lies in that identification information of one secondary AP may be carried in one user information field, and identification information of one secondary AP does not exceed a quantity of bits originally defined for one user info, not affecting interpreting information by the STA. In an example, the identification information of the secondary AP may be placed at a relatively front position in the user info, so that the secondary AP prepares to receive the NDP in advance.

Figure 9E:
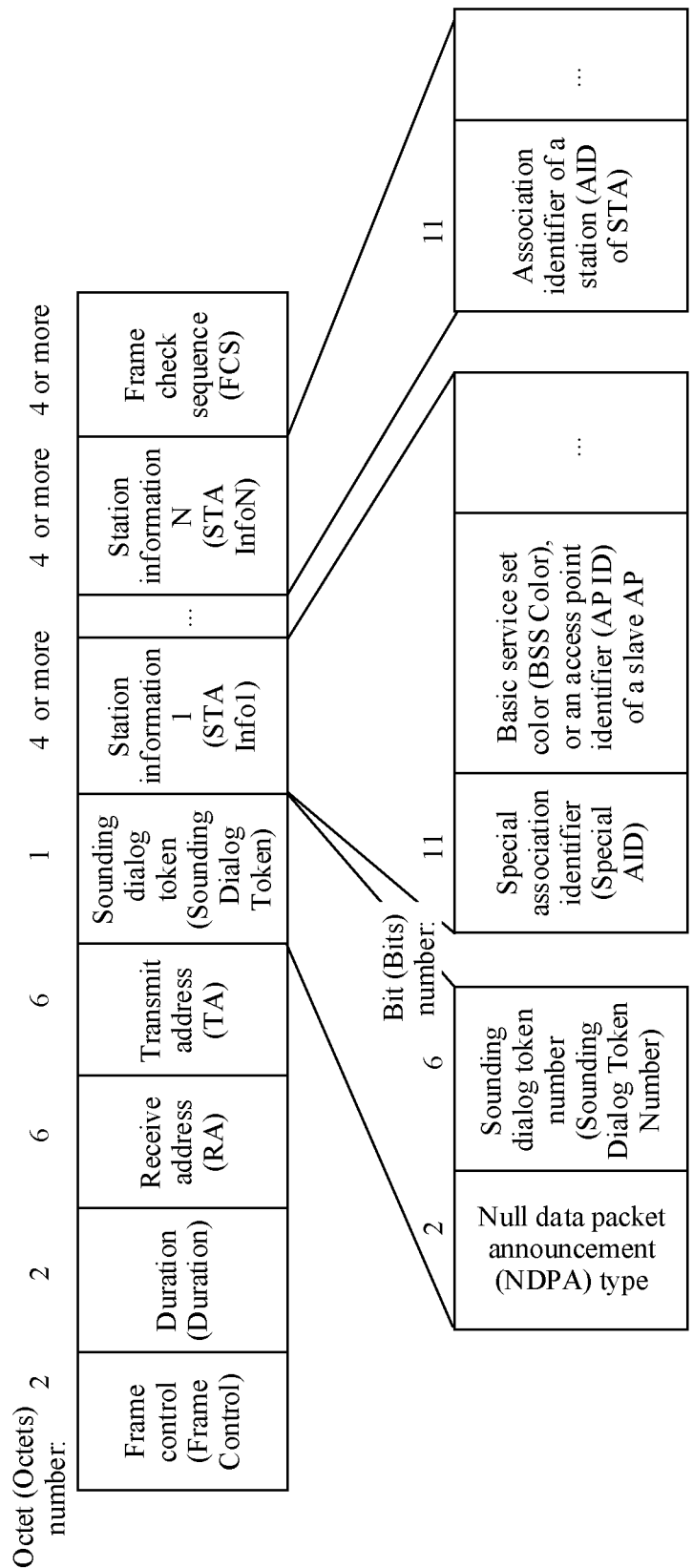
FIG. 9e is a schematic diagram of a composition structure of an NDPA frame according to an embodiment of this application.

It should be noted that, in addition to a structure of the trigger frame, the NDPA frame may also indicate the STA to send the NDP, and notify the secondary AP to prepare to listen to the NDP. As shown in FIG. 9e, in a frame structure of the NDPA frame, the following composition structures are mainly included: a frame control (Frame Control) field, a duration (Duration) field, a receive address (RA) field, a transmit address (transfer address, TA) field, a sounding dialog token (Sounding Dialog Token) field, a station information 1 (STA Info1) field, . . . , a station information N (STA InfoN) field, and a frame check sequence (frame check sequence, FCS) field.

The sounding dialog token (Sounding Dialog Token) field may include a null data packet announcement (NDPA) type field and a sounding dialog token number (Sounding Dialog Token Number) field. The null data packet announcement (NDPA) type field occupies two bits, and the sounding dialog token number (Sounding Dialog Token Number) field occupies six bits.

Similarly, some station information fields may be used to carry the identification information of the secondary AP, and the some other station information fields may be used to carry the identification information of the STA. For example, the station information 1 field is used to carry the identification information of the secondary AP, and the station information 2 to N fields are used to carry the identification information of the STA.

The station information 1 (STA Info1) field occupies 11 bits, and may include a special association identifier (Special AID) field and a basic service set color (BSS Color) field, or an access point identifier (AP ID) of the secondary AP field. The ID of the secondary access point AP may be an AID allocated by the master AP to the secondary AP.

The station information N (STA InfoN) field occupies 11 bits, and includes an association identifier (AID of STA) of the station field.

A specific frame structure of the NDPA frame is not limited in this embodiment of this application. It only needs to notify the scheduled STA to send the NDP and notify the secondary AP to prepare to receive the NDP.

It can be learned from the foregoing examples that, in this embodiment of this application, the master AP directly schedules an implicit sounding procedure applicable to D-MIMO, thereby reducing channel detection overheads. It should be noted that, in addition to the D-MIMO scenario, the obtained channel information can also be used in more scenarios such as ranging, positioning, and intra-cell MIMO.

Figure 10:
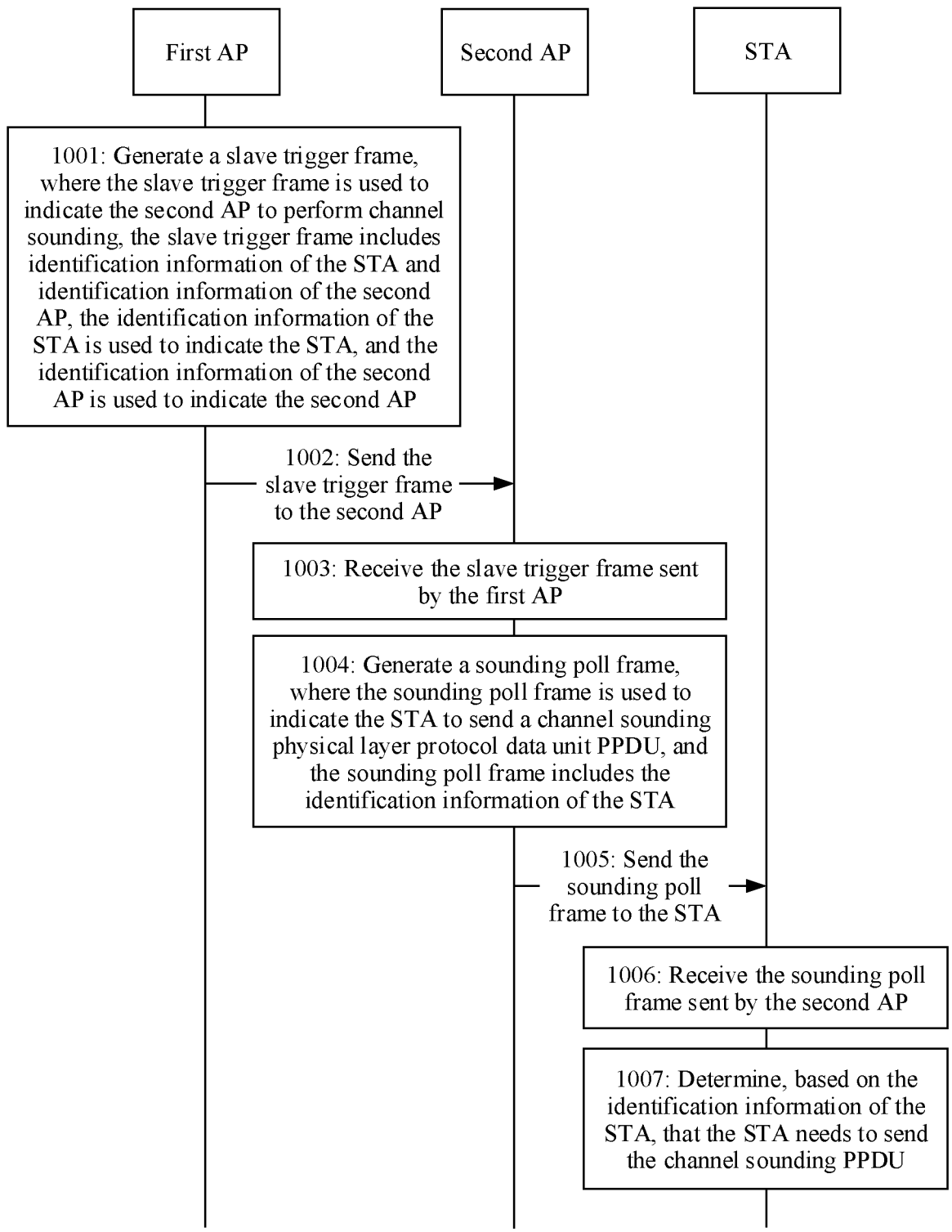
FIG. 10 is a schematic block flowchart of another communication method according to an embodiment of this application.

The following describes another communication method provided in an embodiment of this application. The method in this embodiment of this application cannot only be applied to a scenario in which the first AP can directly communicate with the STA, but can be applied to a scenario in which the first AP cannot directly communicate with the STA. As shown in FIG. 10, the method includes the following steps.

1001: A first AP generates a secondary trigger frame, where the secondary trigger frame indicates a second AP to perform channel sounding, and the secondary trigger frame includes identification information of a STA and identification information of the second AP.

In this embodiment of this application, the first AP may indicate the second AP to perform channel sounding. To indicate which AP or which APs needs/need to send a sounding poll frame, the first AP makes identification information of the AP to be carried in the secondary trigger frame. For example, the first AP indicates the second AP to send the sounding poll frame, and the first AP makes the identification information of the second AP to be carried in notification information. Similarly, to indicate the second AP to schedule a channel sounding PPDU/channel sounding PPDUs sent by which STA or which STAs, the first AP makes identification information of the STA to be carried in notification information.

In some embodiments of this application, the identification information of the STA includes at least one of the following: an association identifier AID of the STA or a media access control MAC address of the STA.

The identification information of the second AP includes at least one of the following: a group identifier corresponding to the second AP, a basic service set color corresponding to the second AP, a group identifier corresponding to the second AP and a basic service set bitmap corresponding to the second AP, an AID of the second AP, or a MAC address of the second AP. For detailed descriptions of the identification information of the STA and the identification information of the second AP, refer to the foregoing descriptions. Details are not described herein again.

1002: The first AP sends the secondary trigger frame to the second AP.

In this embodiment of this application, after the first AP generates the secondary trigger frame, the first AP may send the secondary trigger frame to the second AP, so that the second AP may receive the secondary trigger frame sent by the first AP. The secondary trigger frame may be transmitted between the first AP and the second AP in a wireless transmission manner or wired transmission manner. A specific manner in which the first AP sends the secondary trigger frame is not limited herein.

1003: The second access point AP receives the secondary trigger frame sent by the first AP.

In this embodiment of this application, after the second AP receives the secondary trigger frame, the second AP parses the secondary trigger frame, and obtains the identification information of the STA and the identification information of the second AP from the secondary trigger frame. For detailed descriptions of the identification information of the STA and the identification information of the second AP, refer to the foregoing descriptions. Details are not described herein again.

1004: The second AP generates a sounding poll frame, where the sounding poll frame indicates the STA to send a channel sounding physical layer protocol data unit PPDU, and the sounding poll frame includes the identification information of the STA.

The second AP may generate the sounding poll (sounding poll) frame, where the sounding poll frame may also be referred to as a TF for NDP, the sounding poll frame indicates the STA to send the channel sounding physical layer protocol data unit PPDU, and the sounding poll frame includes the identification information of the STA.

1005: The second AP sends the sounding poll frame to the STA.

In some embodiments of this application, the method provided in this embodiment of this application further includes:

The second AP receives the channel sounding PPDU sent by the STA, and then performs channel estimation based on the channel sounding PPDU.

A specific procedure of channel estimation is not described herein again.

1006: The STA receives the sounding poll frame sent by the second AP, where the sounding poll frame indicates the STA to send the channel sounding physical layer protocol data unit PPDU, and the sounding poll frame includes the identification information of the STA.

1007: The STA determines, based on the identification information of the STA, that the STA needs to send the channel sounding PPDU.

The STA may determine, based on the identification (for example, an AID1) information of the STA carried in the notification information, that the STA needs to send the channel sounding PPDU. Next, the STA may send the channel sounding PPDU.

In some embodiments of this application, after determining, based on the identification (for example, an AID1) information of the STA and the identification information of the second AP that are carried in the notification information, that the STA needs to send the channel sounding PPDU, the STA performs the following step 1009 (not schematically described in FIG. 10). Optionally, the STA may further send the channel sounding PPDU after one short frame space.

Optionally, after step 1007, the second AP may further perform the following step 1008 (not schematically described in FIG. 10).

The second AP receives the channel sounding PPDU sent by the STA, and then performs channel estimation.

In this embodiment of this application, the first AP directly schedules the STA to send the channel sounding PPDU. The first AP needs to send the notification information for only one time, and the second AP and the STA can perform different procedures based on the notification information respectively received by the second AP and the STA. Therefore, channel sounding overheads can be reduced.

Optionally, after step 1007, the first AP may further perform the following step 1009 (not schematically described in FIG. 10).

The first AP receives the channel sounding PPDU sent by the STA, and then performs channel estimation.

In this embodiment of this application, the first AP directly schedules the STA to send the channel sounding PPDU. The first AP needs to send the notification information for only one time, and the second AP and the STA can perform different procedures based on the notification information respectively received by the second AP and the STA. Therefore, channel sounding overheads can be reduced.

Generally, an explicit channel sounding manner is used for multi-AP coordinated transmission. To be specific, an initiator (for example, the AP) of channel sounding sends the NDP to a responder (the STA) of channel sounding, and the STA actually measures a downlink channel from the AP to the STA, and feeds back a measured channel detection result to the AP. The feedback channel measurement result includes multiple downlink channel measurement results between the plurality of APs and the STA. Therefore, feedback overheads are relatively large.

In this embodiment of this application, an implicit channel sounding manner is used for multi-AP coordinated transmission. To be specific, the AP schedules the STA to send the NDP, the STA sends the NDP to the AP, and the AP measures an uplink channel from the STA to the AP, and uses channel dissimilarity, to obtain a channel measurement result of a downlink channel from the AP to the STA. The AP is an obtainer of the channel measurement result, and does not need to feed back the channel measurement result over an air interface. Therefore, overheads of feeding back the channel measurement result are reduced.

A manner of carrying the notification information is described in detail below.

In some embodiments of this application, the notification information is carried in a secondary trigger frame, and the secondary trigger frame includes a common information field and a user information field. The identification information of the STA is carried in the common information field, and the identification information of the second AP is carried in the user information field. For detailed descriptions of the identification information of the STA and the identification information of the second AP, refer to the foregoing descriptions. Details are not described herein again.

Figure 11:
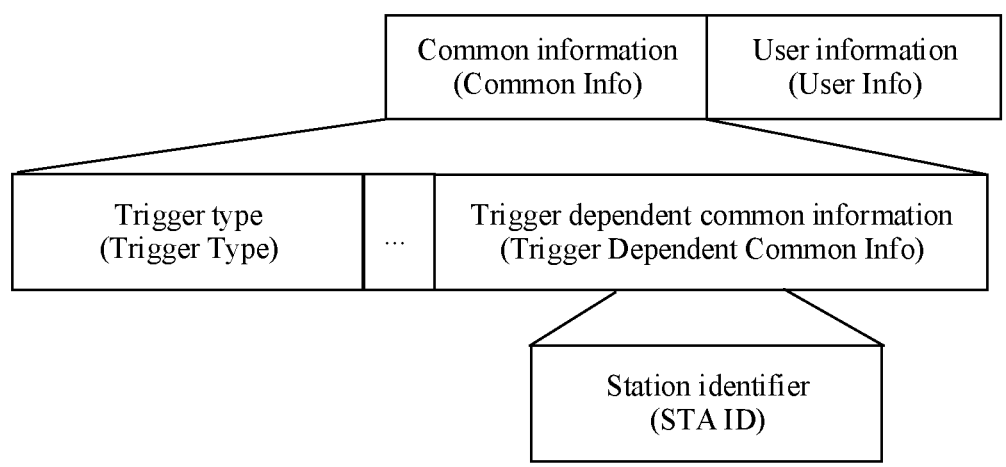
FIG. 11 is a schematic diagram of a composition structure of another secondary trigger frame according to an embodiment of this application.

In some embodiments of this application, FIG. 11 is a schematic diagram of a composition structure of a secondary trigger frame. The common information field includes a trigger type subfield and a trigger dependent common information subfield. The trigger type subfield indicates a trigger type of the secondary trigger frame, and the trigger dependent common information subfield includes the identification information of the STA.

The trigger type subfield may indicate the trigger type of the secondary trigger frame, and different values of the trigger type subfield may indicate different trigger types of the trigger frame. For example, the trigger type subfield may occupy four bits. When a value of the trigger type subfield is any one of 8 to 15, it may be indicated that the trigger frame is the secondary trigger frame used to carry the notification information. The trigger dependent common information subfield is a subfield in the common information field, and the trigger dependent common information subfield may carry the identification information of the STA. The identification information of the STA may be described in a plurality of foregoing examples, and details are not described herein again. The common information field in the secondary trigger frame may carry the identification information of the foregoing STA. After receiving the secondary trigger frame, the second AP and the STA may determine the trigger type of the secondary trigger frame by using the trigger type subfield in the secondary trigger frame. The identification information of the STA may be obtained by using the trigger dependent common information subfield.

In some embodiments of this application, the method provided in this embodiment of this application further includes:

The first AP generates a sounding poll frame, where the sounding poll frame indicates the STA to send a channel sounding physical layer protocol data unit PPDU, and the sounding poll frame includes the identification information of the STA.

The first AP sends the sounding poll frame to the STA. The first AP may also generate the sounding poll frame, and then send the sounding poll frame to the STA.

It can be learned from the foregoing description of this embodiment of this application that, in this embodiment of this application, the first AP sends the notification information for one time, and schedules, by using the notification information, the second AP to send the sounding poll frame, and the second AP schedules the STA, by using the sounding poll frame, to send the channel sounding PPDU, so that the second AP that receives the notification information implements channel sounding. Based on a signaling structure design solution applicable to a scenario of multi-AP coordinated transmission provided in this embodiment of this application, after receiving the sounding poll frame, the STA may further send the channel sounding PPDU, and the AP that receives the channel sounding PPDU performs channel estimation based on the channel sounding PPDU, thereby obtaining channel state information. Compared with a common channel sounding procedure, in this embodiment of this application, the AP can implement channel sounding between the AP and the STA without a plurality of times of scheduling, thereby reducing channel sounding overheads, and improving channel sounding efficiency.

Figure 12:
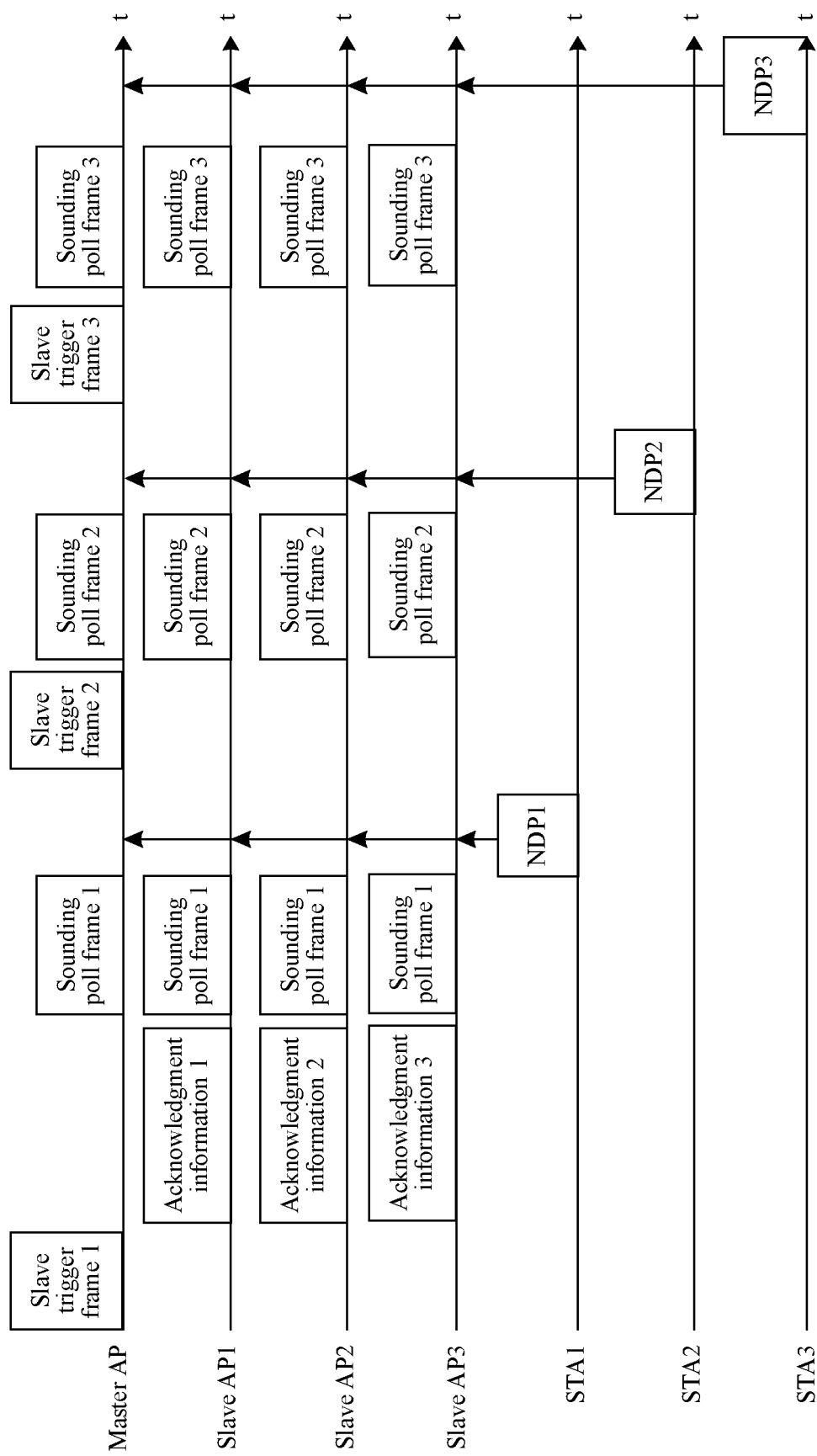
FIG. 12 is a schematic flowchart in which a master AP triggers a secondary AP to schedule a STA to send an NDP according to an embodiment of this application.

The following further describes the communication method provided in this embodiment of this application. An example in which the first AP is a master (master) AP, and the second AP comprises three secondary (secondary) APs is used for description. The first AP may communicate with three secondary APs and three STAs. The foregoing embodiment is applicable to a scenario in which a scheduled STA can receive a secondary TF sent by the master AP. When the STA cannot receive a secondary TF sent by the master AP, the following embodiment needs to be used. FIG. 12 is a schematic flowchart in which a master AP triggers a secondary AP to schedule a STA to send an NDP according to an embodiment of this application. The master AP triggers the secondary AP to schedule the STA to send the NDP, to implement an implicit channel sounding procedure. The procedure mainly includes the following steps:

S11: A master AP sends a secondary TF1, to indicate one or more secondary APs to perform implicit channel sounding.

S12: The secondary AP replies with acknowledgment information to the master AP. By replying with the acknowledgment information, the master AP may learn, in advance, of a list of secondary APs that can participate in implicit channel sounding together. In addition, the secondary AP can obtain time for channel sounding by relaying with the acknowledgment information. Step S12 is optional.

For example, the master AP may send the secondary trigger frame 1, a secondary trigger frame 2, and a secondary trigger frame 3. After the master AP sends the secondary trigger frame 1, the secondary AP1 may send acknowledgment information 1, the secondary AP2 may send acknowledgment information 2, and the secondary AP3 may send acknowledgment information 3.

S13: The master AP and the secondary AP send a sounding poll frame 1. Alternatively, a plurality of secondary APs send sounding poll frames. The sounding poll frame may also be referred to as a TF for NDP, and is used to schedule the STA to send the NDP.

For example, the secondary AP1 may send the sounding poll frame 1, the secondary AP2 may send a sounding poll frame 2, and the secondary AP3 may send a sounding poll frame 3.

S14: After receiving the sounding poll frame, the STA1 sends an NDP1.

S15: The master AP and the secondary AP receive the NDP1, and perform channel estimation.

Similarly, a plurality of STAs may send the NDP in a UL OFDMA manner, UL MU-MIMO manner, or temporal serialization manner. For details, refer to the description of the foregoing embodiment.

The following describes frame structures of the secondary TF and the sounding poll frame. The frame structure of the secondary TF is first described.

Figure 13A:
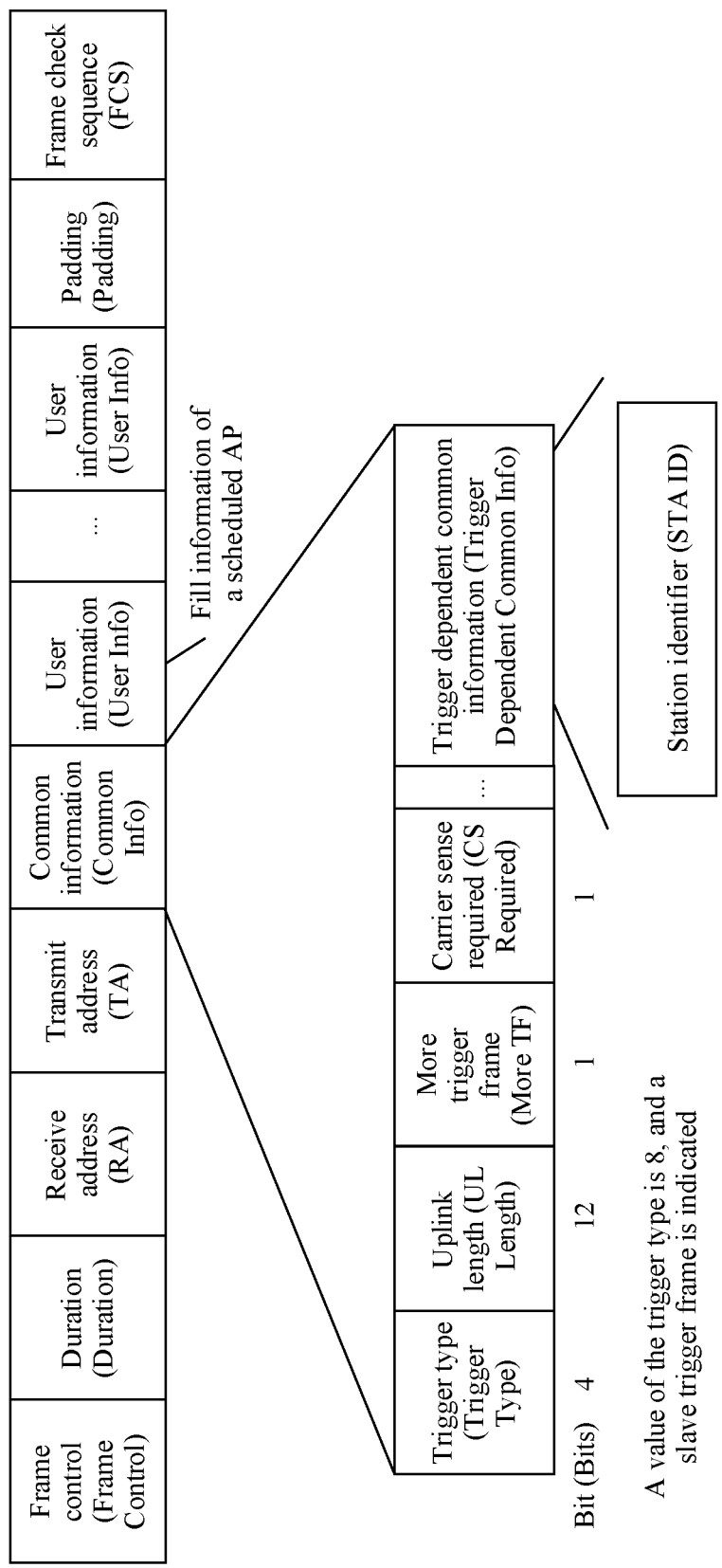
FIG. 13a is a schematic diagram of a composition structure of another secondary trigger frame according to an embodiment of this application.

As shown in FIG. 13a, in a frame structure of the secondary TF, a composition structure of the following fields is mainly included: a frame control (Frame Control) field, a duration (Duration) field, a receive address (RA) field, a transmit address (transfer address, TA) field, a common information (Common Info) field, a user information (User Info) field, a padding (Padding) field, and a frame check sequence (FCS) field. The common information field may include fields such as a trigger type (Trigger Type) field, an uplink length (UL Length) field, a more trigger frame (More TF) field, a carrier sense required (CS Required) field, and a trigger dependent common information (Trigger Dependent Common Info) field.

The trigger type field occupies a plurality of bits, for example, four bits, and a value of the trigger type field is 9, and the secondary trigger frame is indicated. What is not limited is that the value of the trigger type field may alternatively be 10 or another value.

The trigger dependent common information field can be used to carry a station identifier (STA ID).

The user information field may carry information about a scheduled AP.

In the secondary TF, the user info directly carries information about the secondary AP, and may include a BSS Color, an AP ID, an AID of the secondary AP, or the like. Optionally, corresponding trigger dependent common info in a common part carries identification information of a STA that needs to participate in implicit channel sounding, that is, needs to send an NDP subsequently, to notify the STA to prepare in advance. Certainly, the identification information of the STA and the secondary AP may alternatively be carried in the manners shown in FIG. 9c and FIG. 9d. A difference lies in that, in the embodiment shown in FIG. 13a, the STA does not immediately respond, but sends the NDP after receiving the sounding poll frame.

The sounding poll frame sent by the second AP may be a trigger frame used for ranging and positioning. Alternatively, the trigger frame used to schedule the STA to send the NDP may be independently defined. A trigger frame type is indicated as the sounding poll field, and a trigger frame of the sounding poll type is used to trigger the STA to send the NDP. The user info indicates corresponding information of a scheduled STA, for example, an AID of the scheduled STA.

A frame format described above is mainly for a MAC frame structure over a radio air interface. Communication between one AP and another AP may also be performed by using a wired MAC frame structure, that is, transmission is performed in a wired manner.

Figure 13B:
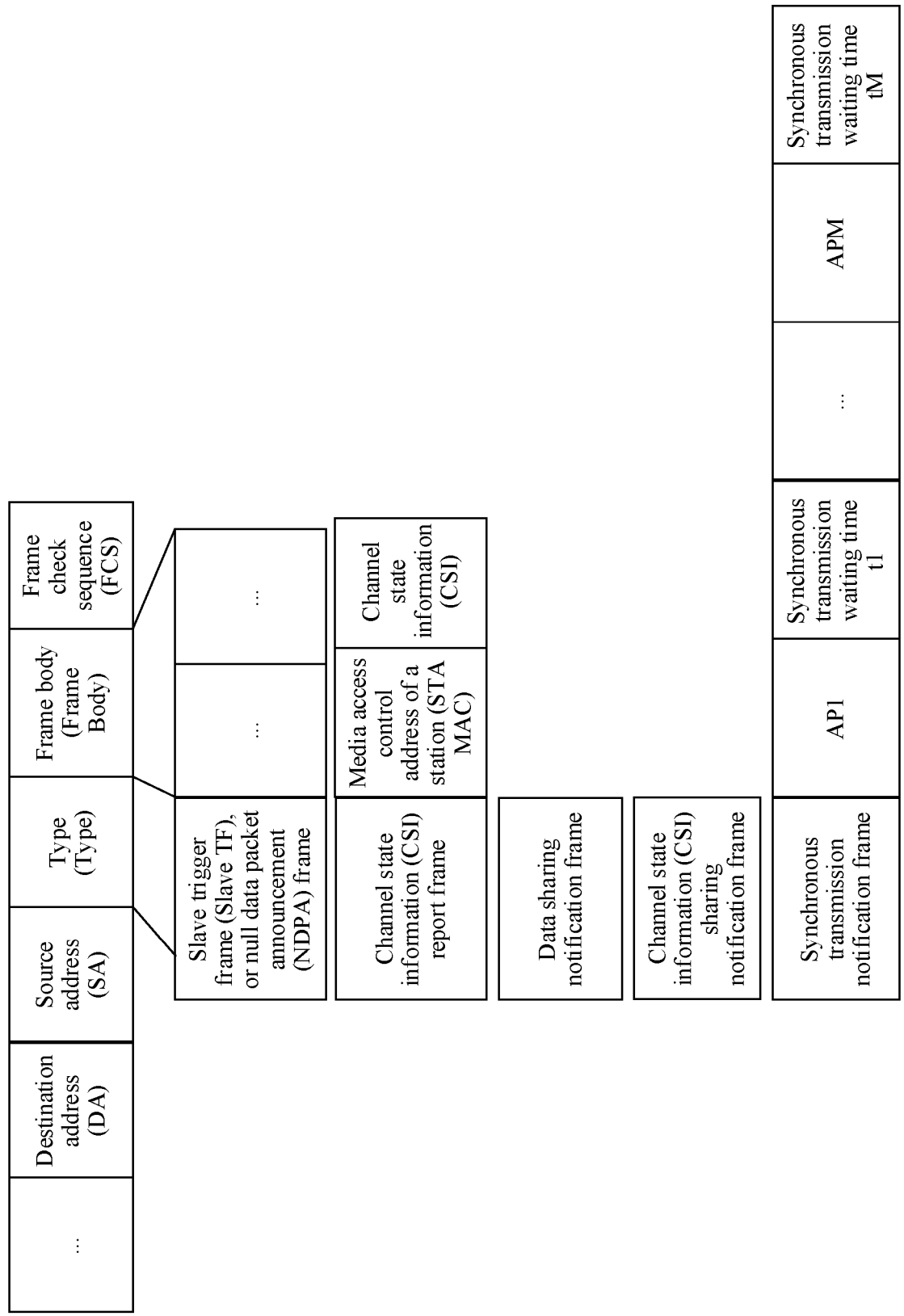
FIG. 13b is a schematic diagram of a frame structure of a MAC frame according to an embodiment of this application.

FIG. 13b is a schematic diagram of a frame structure of a MAC frame according to an embodiment of this application. The MAC frame mainly includes: a destination address (DA) field, a source address (SA) field, a type (Type) field, a frame body (frame body) field, and a frame check sequence (FCS) field. The type field indicates a specific type of the wired MAC frame. The type field may include the following types:

1. Secondary TF or NDPA frame type: Frame body content of the secondary TF is the same as frame body content of the secondary TF in the embodiment shown in FIG. 13a, and details are not described herein again.

2. A channel state information (CSI) report frame is used by the secondary AP to feed back estimated CSI to the master AP in a wired manner.

3. Data sharing notification frame is used by the master AP to request data from the secondary AP.

4. CSI sharing notification frame is used by the master AP to request CSI from the secondary AP.

5. Synchronous transmission notification frame is used to notify a plurality of secondary APs to send MAC frames of different types together, such as sounding poll and data. t1 to tm is a time offset. When synchronous transmission is performed over the air interface, the time offset is used to help the secondary AP adjust time for sending MAC frames over the air interface based on a wired delay.

In this embodiment of this application, a method in which the master AP schedules, by using the secondary AP, the STA to perform implicit channel sounding is described, and a specific design of the frame format is provided. Based on the foregoing implicit channel sounding procedure, channel sounding overheads can be reduced in this embodiment of this application.

The following describes another embodiment provided in an embodiment of this application, and designs how to allocate an AID of a STA in AP coordinated transmission such as D-MIMO. The AID in a BSS can uniquely identify a STA associated with the current BSS. However, for a scenario of AP coordinated transmission such as the D-MIMO, a plurality of APs may allocate a same AID to a plurality of STAs in different BSSs. For the same AID, STAs in a plurality of BSSs consider that the STAs themselves are scheduled, and a data sending conflict occurs. How to uniquely identify the STA in the scenario of AP coordinated transmission by using the AID is another problem to be resolved in this embodiment of this application.

FIG. 14a is a schematic diagram of an AID allocation situation according to an embodiment of this application. All AIDs may be classified into the following three types. A first type is a non-D-MIMO AID interval that can be used by a BSS1, . . . , and a BSSk. A second type is a reserved AID interval. A third type is a D-MIMO AID interval of each BSS (for example, a D-MIMO AID interval of the BSS1, . . . , and a D-MIMO AID interval of the BSSk). The non-D-MIMO AID interval may be used by all BSSs. A D-MIMO AID interval of each BSS can be used only by the BSS, and different BSSs in a D-MIMO group share a same non-D-

MIMO AID interval. However, an AID value of the D-MIMO AID interval of each BSS does not overlap.

The non-D-MIMO AID interval that can be used by the BSS1 to the BSSk is an AID interval that can be used when each BSS performs intra-cell communication. Because inter-BSS communication is not related, a STA may be uniquely identified in each BSS. When AP coordinated transmission such as the D-MIMO is participated, a different AID may be allocated to a STA that participates in D-MIMO transmission and that is in each BSS. In this way, a STA that participates in the D-MIMO may also be uniquely identified. It should be noted that two AIDs are allocated to the STA that participates in D-MIMO transmission, one is an AID used by the STA to perform intra-BSS communication with an AP of the BSS in which the STA is located, and the other is an AID used when the STA participates in D-MIMO transmission. In addition, the reserved AID interval is a temporarily unallocated AID interval, and is mainly used for subsequent flexible allocation.

It should be noted that the D-MIMO AID intervals of the BSS1, . . . , and BSSk include one to more AID intervals, and AIDs of STAs associated with several APs that participate in D-MIMO transmission do not overlap with each other.

Figure 14B:
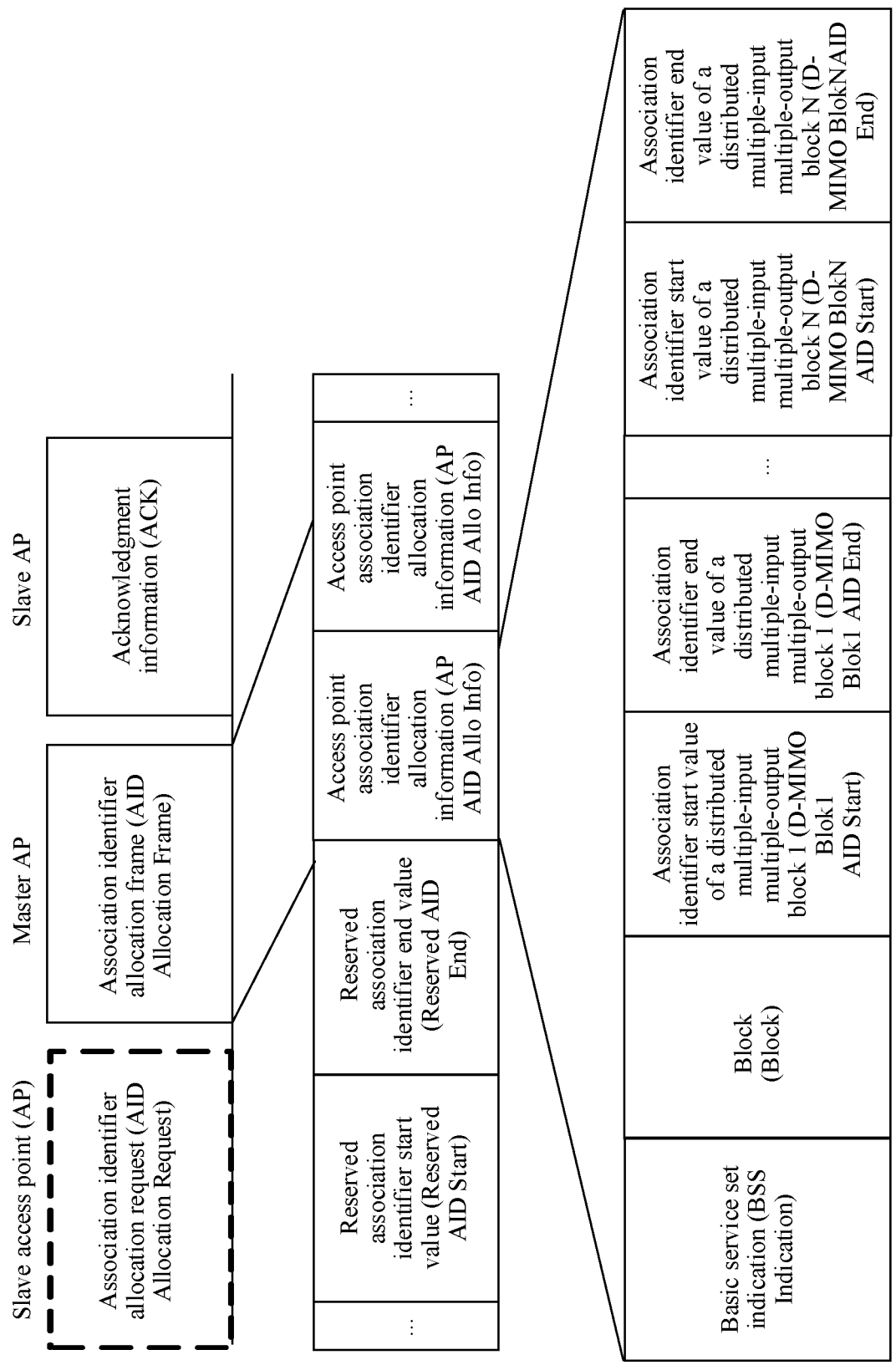
FIG. 14b is a schematic diagram of an AID interaction procedure according to an embodiment of this application.

FIG. 14b is a schematic diagram of an AID interaction procedure according to an embodiment of this application. The following describes a simple interaction procedure. Optionally, the secondary AP first sends an AID allocation request (AID Allocation Request) to the master AP, to request the master AP to allocate a D-MIMO AID interval to the secondary AP. The master AP further sends an AID allocation frame (AID Allocation frame) to the secondary AP, and allocates an AID to the secondary AP. After receiving the allocated AID, the secondary AP may further send acknowledgment information (ACK). The AID allocation frame may include: a reserved association identifier start value (Reserved AID Start), a reserved association identifier end value (Reserved AID End), access point association identifier allocation information (AP AID Allo Info), and access point association identifier allocation information (AP AID Allo Info).

The access point association identifier allocation information (AP AID Allo Info) includes: a basic service set indication (BSS Indication), a block (Block), an association identifier start value of a distributed multiple-input multiple-output block 1 (D-MIMO Block1 AID Start), an association identifier end value of a distributed multiple-input multiple-output block 1 (D-MIMO Block1 AID End), . . . , an association identifier start value of a distributed multiple-input multiple-output block N (D-MIMO BlockN AID Start), and an association identifier end value of a distributed multiple-input multiple-output block N (D-MIMO BlockNAID End). For example, the AID allocation frame includes the AID start value and the AID end value of the reserved AID interval. AP AID allocation information includes identification information of the BSS, a quantity of blocks, and a start value and an end value of an AID in each block.

FIG. 14c is another schematic diagram of an AID allocation situation according to an embodiment of this application. Different from FIG. 14a, all APs share a same non-D-MIMO interval and a same D-MIMO interval. In this case, different APs need to communicate D-MIMO AID information allocated by the APs to STAs to which the APs belong with each other in real time, to prevent an AID conflict in different BSSs.

It can be learned from the foregoing examples that an embodiment of this application provides an AID allocation manner applicable to AP coordinated transmission and intra-cell transmission, thereby resolving an AID allocation problem.

The following describes another embodiment provided in this embodiment of this application. An AP and a STA to which the AP belongs may join a plurality of D-MIMO groups. In this case, a plurality of D-MIMO AIDs may be allocated. In this case, the STA cannot determine data transmission, of which D-MIMO group, that the STA participates in, and cannot determine whether the STA itself is scheduled. To solve this problem, in this embodiment of this application, D-MIMO GID indication information is introduced into a data packet, and the D-MIMO GID indication information indicates a D-MIMO group that participates in data transmission.

Figure 15A:
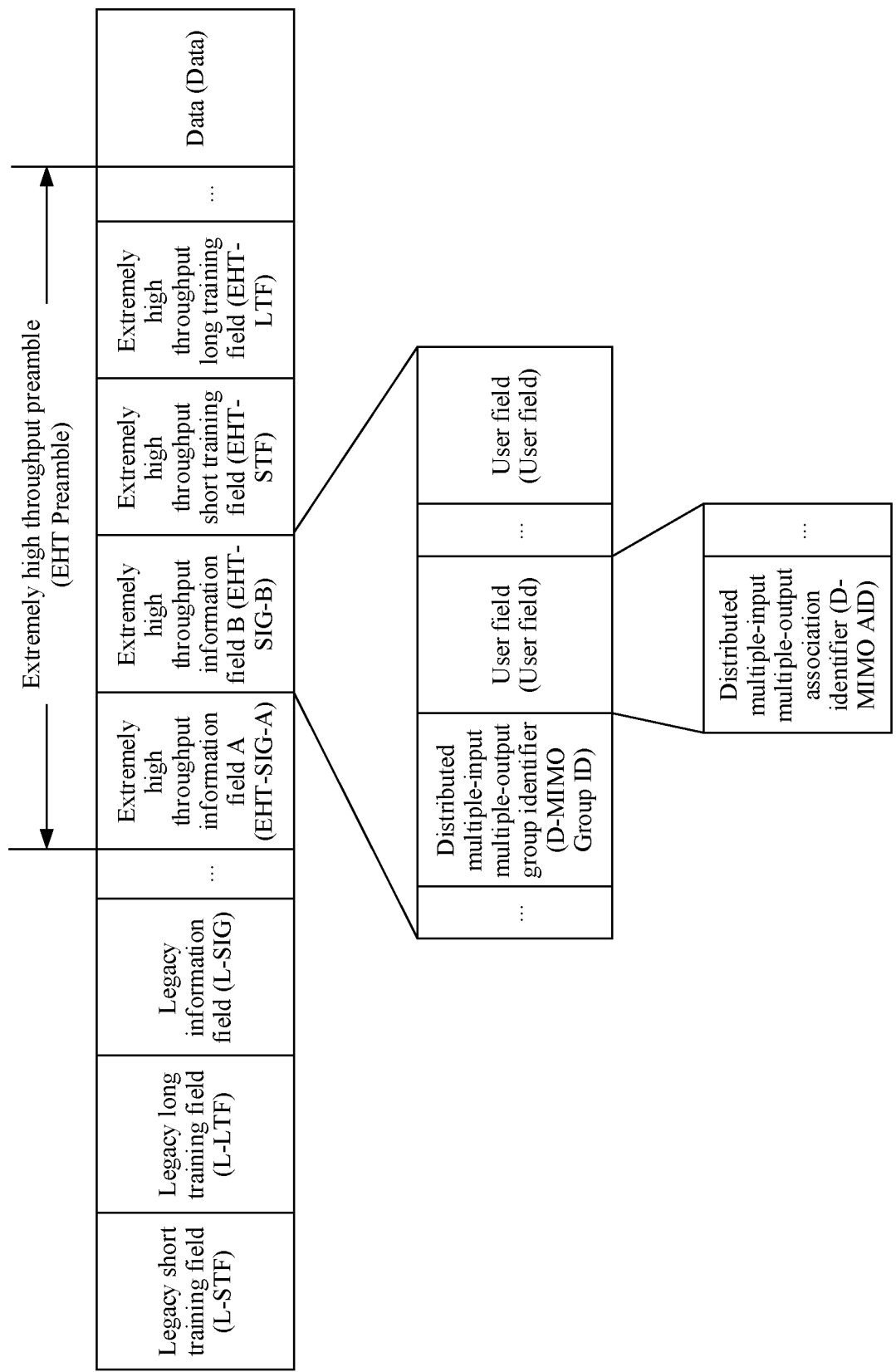
FIG. 15a is a schematic diagram of an EHT data packet structure including a D-MIMO GID indication according to an embodiment of this application.

FIG. 15a is a schematic diagram of an EHT data packet structure including a D-MIMO GID indication according to an embodiment of this application. The EHT data packet structure may include: a legacy short training field (L-STF), a legacy long training field (L-LTF), a legacy information field (L-SIG), an extremely high throughput information field A (EHT-SIG-A), an extremely high throughput information field B (EHT-SIG-B), an extremely high throughput short training field (EHT-STF), and an extremely high throughput long training field (EHT-LTF).

The extremely high throughput information field B (EHT-SIG-B) includes a distributed multiple-input multiple-output group identifier (D-MIMO Group ID) and a plurality of user fields (User field). One user field (User field) includes a distributed multiple-input multiple-output association identifier (D-MIMO AID).

For example, the D-MIMO GID is indicated in a signaling field such as the EHT-SIG-A or the EHT-SIG-B, and the D-MIMO GID explicitly indicates which D-MIMO group that initiates data transmission. This indication manner is also applicable to a trigger information indication in the secondary TF. Further, a D-MIMO AID of a STA that participates in D-MIMO transmission is indicated in the user field.

For another example, whether transmission is D-MIMO transmission may be first indicated, and if transmission is D-MIMO transmission, the D-MIMO GID is further indicated. Further, a D-MIMO AID of a STA that participates in D-MIMO transmission is indicated in the user field. If transmission is not D-MIMO transmission, the D-MIMO GID may not be indicated. A subsequent user field also refers to an AID of a STA in a BSS.

Figure 15B:
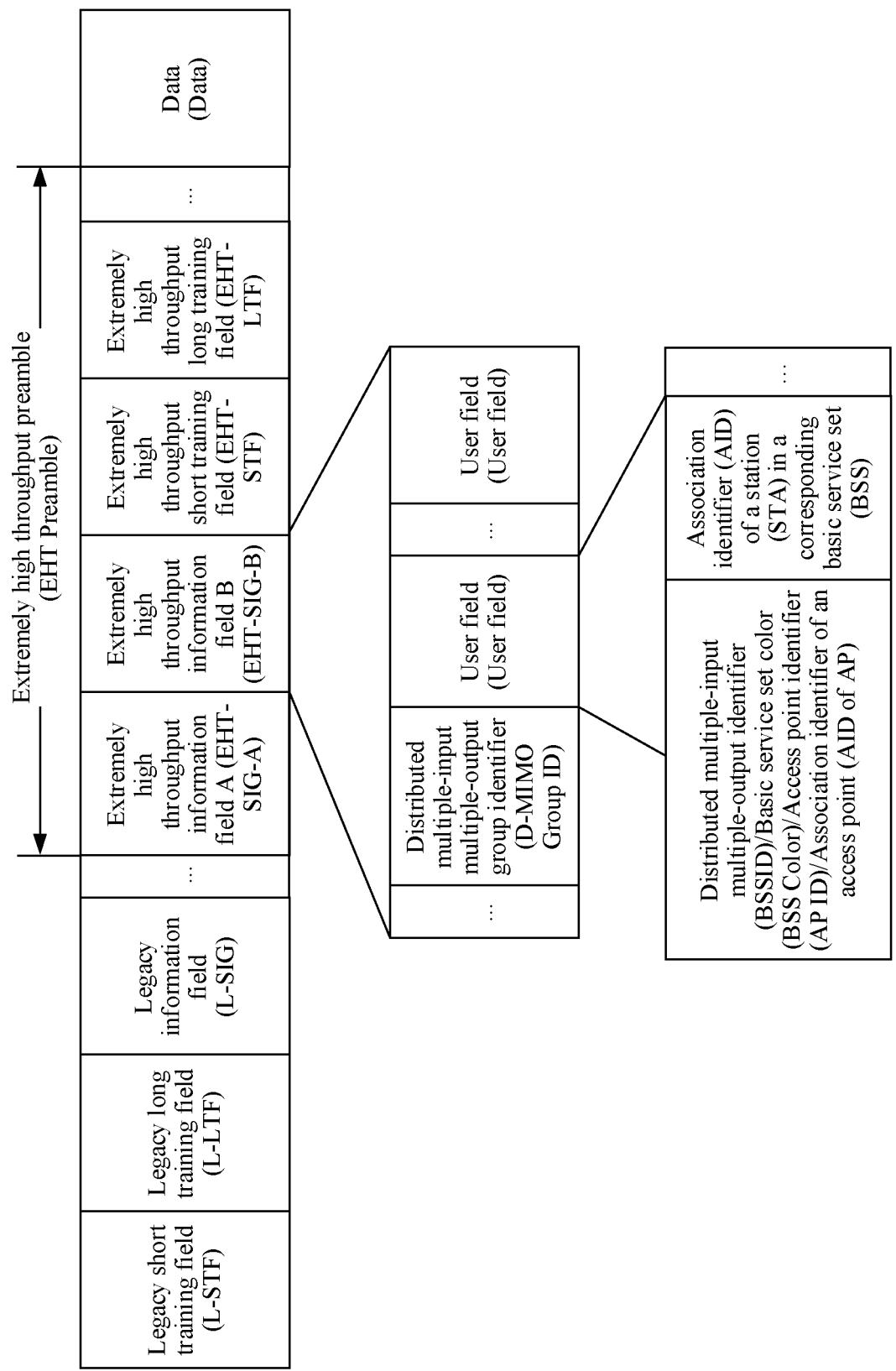
FIG. 15b is a schematic diagram of another EHT data packet structure including a D-MIMO GID indication according to an embodiment of this application.

FIG. 15b is a schematic diagram of another EHT data packet structure including a D-MIMO GID indication according to an embodiment of this application. The EHT data packet structure may include: a legacy short training field (L-STF), a legacy long training field (L-LTF), a legacy information field (L-SIG), an extremely high throughput information field A (EHT-SIG-A), an extremely high throughput information field B (EHT-SIG-B), an extremely high throughput short training field (EHT-STF), and an extremely high throughput long training field (EHT-LTF).

The extremely high throughput information field B (EHT-SIG-B) includes a distributed multiple-input multiple-output group identifier (D-MIMO Group ID) and a plurality of user fields (User field). The user field (User field) includes a distributed multiple-input multiple-output identifier (BSSID)/a basic service set color (BSS Color)/an access point identifier (AP ID)/an association identifier of an access point (AID of AP), and an association identifier (AID) of a station (STA) in a corresponding basic service set (BSS).

For example, which STA in which BBS is clearly marked by using a method of BSSID/BSS Color/AP ID/AID of AP+AID in cell.

It can be learned from the foregoing examples that, the embodiments of this application provide the signaling indication method in which the AP in the scenario of the plurality of D-MIMO GIDs uniquely indicates the STA, to implement the indication of the STA, uniquely identify the STA that participates in D-MIMO transmission, and prevent the AID conflict. The solution in which the D-MIMO GID indication information is configured in this embodiment of this application may also be applied to multi-AP coordination, and is not limited to the D-MIMO.

The foregoing embodiment describes the method provided in the embodiments of this application. The following describes a communication apparatus provided in an embodiment of this application. The communication apparatus may include any one of the foregoing first AP, the second AP, and the STA.

Figure 16:
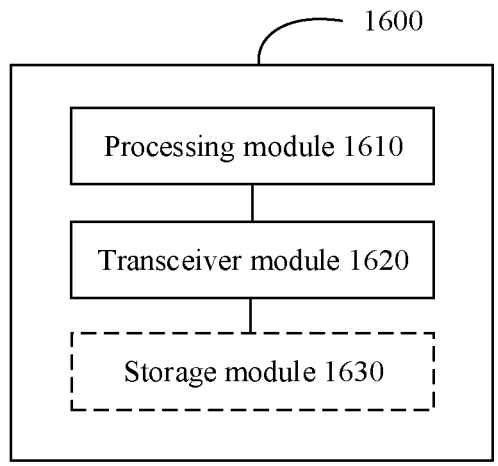
FIG. 16 is a schematic diagram of a composition structure of a communication apparatus according to an embodiment of this application.

FIG. 16 is a schematic block diagram of a communication apparatus 1600 according to an embodiment of this application. In an embodiment, the apparatus 1600 shown in FIG. 16 may be corresponding to the communication apparatus in the foregoing method embodiment, and may have any function of the first access point, the second access point, or the STA in the method. Optionally, the apparatus 1600 in this embodiment of this application may be the first access point, or may be a chip in the first access point. The apparatus 1600 in this embodiment of this application may be the second access point, or may be a chip in the second access point. The apparatus 1600 in this embodiment of this application may be the station, or may be a chip in the station. The apparatus 1600 may include a processing module 1610 and a transceiver module 1620. Optionally, the apparatus 1600 may further include a storage module 1630.

In an embodiment, the communication apparatus 1600 is the first access point or the chip in the first access point.

The processing module 1610 may be configured to generate the signaling or data information sent in the foregoing method embodiment, for example, generate the notification information sent in step 301, and may further be configured to control, based on the notification information, the transceiver module 1620 to send the notification information to transmission between the second AP and the STA. For example, step 302 may be performed. The processing module 1610 may further be configured to generate the secondary trigger frame in step 1001.

The transceiver module 1620 is configured to support the first access point AP in communicating with the second AP, the station, and another node. It may be understood that the transceiver module may include a receiving module and a sending module. The sending module may be configured to perform step 302 and step 1002 in the foregoing method embodiments.

In another embodiment, the communication apparatus 1600 is the second access point or the chip in the second access point.

The processing module 1610 may parse and process the signaling or data information sent in the foregoing method embodiment, for example, the notification information. For example, step 304 may be performed. The processing module 1610 may further be configured to generate the signaling sent in the foregoing embodiment, for example, the sounding poll frame. For example, step 1004 may be performed.

The transceiver module 1620 is configured to support the second access point AP in communicating with the first AP, the station, and another node. It may be understood that the transceiver module may include a receiving module and a sending module. The sending module may be configured to perform step 1005 in the foregoing method embodiment. The receiving module may be configured to perform step 303 and step 1003 in the foregoing method embodiments.

In still another embodiment, the communication apparatus 1600 is the station or the chip in the station.

The processing module 1610 may parse and process the signaling or data information sent in the foregoing method embodiment, for example, the notification information. For example, step 306 may be performed. The processing module 1610 may further be configured to generate the signaling sent in the foregoing embodiment, for example, the NDP. The processing module 1610 may further determine to perform step 1007 in the foregoing embodiment.

The transceiver module 1620 is configured to support the station STA in communicating with the first AP, the second AP, and another node. It may be understood that the transceiver module may include a receiving module and a sending module. The receiving module may be configured to perform step 1006 and step 305 in the foregoing method embodiments.

It should be understood that the apparatus 1600 according to this embodiment of this application may be corresponding to the first access point, the second access point, or the STA in the methods in the foregoing embodiments, and the foregoing and other management operations and/or functions of the modules in the apparatus 1600 are separately intended to implement corresponding steps of the foregoing methods. For brevity, details are not described herein again.

Alternatively, the apparatus 1600 may be configured as a universal processing system, which, for example, is generally referred to as a chip. The processing module 1610 may include one or more processors that provide a processing function. The transceiver module 1620, for example, may be an input/output interface, a pin, or a circuit. The input/output interface may be configured to be responsible for information exchange between the chip system and the outside. For example, the input/output interface may output the transmission control information generated by the first access point AP to another module outside the chip for processing. The processing module may execute a computer-executable instruction stored in the storage module, to implement the functions of the first access point in the foregoing method embodiments. In an example, the storage module 1630 optionally included in the apparatus 1600 may be a storage unit in the chip, for example, a register or a buffer. The storage module 1630 may alternatively be a storage unit that is located outside the chip, for example, a read-only memory (ROM for short), another type of static storage device that can store static information and an instruction, or a random access memory (RAM for short).

Figure 17:
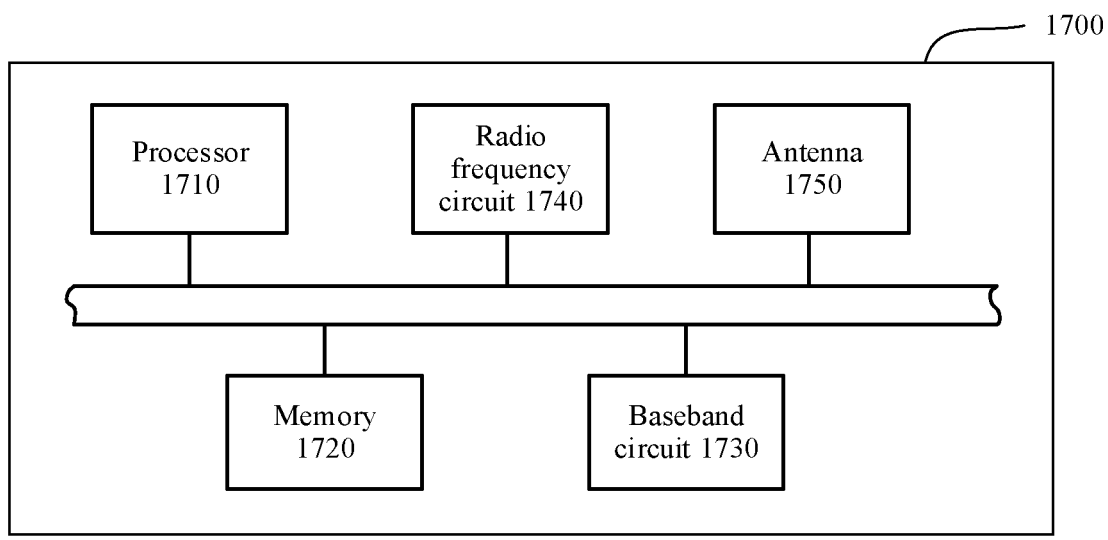
FIG. 17 is a schematic diagram of a composition structure of another communication apparatus according to an embodiment of this application.

In another example, FIG. 17 is a schematic block diagram of another communication apparatus 1700 according to an embodiment of this application. The apparatus 1700 in this embodiment of this application may be the first access point, the second access point, or the STA in the foregoing method embodiments, and the apparatus 1700 may be configured to perform some or all functions of the first access point, the second access point, or the STA in the foregoing method embodiments. The apparatus 1700 may include a processor 1710, a baseband circuit 1730, a radio frequency circuit 1740, and an antenna 1750. Optionally, the apparatus 1700 may further include a memory 1720. Components of the apparatus 1700 are coupled together through a bus. In addition to a data bus, the bus system includes a power bus, a control bus, and a status signal bus. However, for clear description, various types of buses in the figure are marked as the bus system.

The processor 1710 may be configured to control the first access point, the second access point, or the STA, and is configured to perform processing performed by the first access point, the second access point, or the STA in the foregoing embodiments. The processor 1710 may perform a processing process related to the first access point, the second access point, or the STA in the foregoing method embodiments and/or another process used for the technology described in this application. Further, the processor 1710 may run an operating system, is responsible for managing the bus, and may execute a program or an instruction stored in the memory.

The baseband circuit 1730, the radio frequency circuit 1740, and the antenna 1750 may be configured to support information receiving and sending between the first access point and the second access point or the station in the foregoing embodiments, to support wireless communication between the first access point and another node. For example, the transmission control information sent by the first access point may be processed by the processor 1710; processed by the baseband circuit 1730 through baseband processing such as protocol-based encapsulation and encoding; processed by the radio frequency circuit 1740 through radio frequency processing such as analog conversion, filtering, amplification, and up-conversion; and sent to the second access point AP through the antenna 1750. It may be understood that the baseband circuit 1730, the radio frequency circuit 1740, and the antenna 1750 may further be configured to support the first access point in communicating with another network entity.

The memory 1720 may be configured to store program code and data of the first access point, the second access point, or the STA. The memory 1720 may be the storage module 1630 in FIG. 16. As shown in FIG. 17, the memory 1720 is separated from the processor 1710. However, a person skilled in the art very easily understands that the memory 1720 or any part of the memory 1720 may be located outside the apparatus 1700. For example, the memory 1720 may include a transmission cable and/or a computer product separated from a wireless node. The media may be accessed by the processor 1710 through the bus interface. Alternatively, the memory 1720 or any portion thereof may be integrated into the processor 1710, for example, may be a cache and/or a general purpose register.

In an example, the transceiver module 1620 in FIG. 16 may include the baseband circuit 1730, the radio frequency circuit 1740, and the antenna 1750. The processing module 1610 may be the processor 1710. In another example, the transceiver module 1620 in FIG. 16 may include only the antenna in FIG. 17. The processing module 1610 may include not only the processor 1710, but also the radio frequency circuit 1740 and the baseband circuit 1730. In still another example, the processing module 1610 in FIG. 16 may include the processor 1710 and the baseband circuit 1730. The transceiver module 1620 may include the radio frequency circuit 1740 and the antenna 1750.

It may be understood that FIG. 17 shows only a simplified design of the first access point, the second access point, or the STA. For example, in actual application, the first access point, the second access point, or the STA may include any quantity of transmitters, receivers, processors, memories, and the like, and all first access points, second access points, or STAs that can implement the embodiments of this application fall within the protection scope of the embodiments of this application.

An embodiment of this application further provides a computer storage medium. The computer-readable storage medium stores instructions, and the instructions may be executed by one or more processors on a processing circuit. When the instructions are run on a computer, the computer is enabled to perform the method according to the foregoing aspects.

An embodiment of this application further provides a chip system. The chip system includes a processor, configured to support a distributed unit, a centralized unit, a first access point, and a second access point to implement a function in the foregoing embodiments, for example, generate or process data and/or information in the foregoing methods.

In a possible design, the chip system may further include a memory. The memory is configured to store program instructions and data that are necessary for the distributed unit, the centralized unit, the first access point, and the second access point. The chip system may include a chip, or may include a chip and another discrete device.

An embodiment of this application further provides a processor, configured to be coupled to a memory. The processor is configured to perform the method and the function of the first access point AP in any one of the foregoing embodiments.

An embodiment of this application further provides a processor, configured to be coupled to a memory. The processor is configured to perform the method and the function of the second access point AP in any one of the foregoing embodiments.

An embodiment of this application further provides a processor, configured to be coupled to a memory. The processor is configured to perform the method and the function of the STA in any one of the foregoing embodiments.

An embodiment of this application further provides a computer program product including instructions. When the computer program product is run on a computer, the computer is enabled to perform the method and the function of the first access point AP in any one of the foregoing embodiments.

An embodiment of this application further provides a computer program product including instructions. When the computer program product is run on a computer, the computer is enabled to perform the method and the function of the second access point AP in any one of the foregoing embodiments.

An embodiment of this application further provides a computer program product including instructions. When the product is run on a computer, the computer is enabled to perform the method and the function of the STA in any one of the foregoing embodiments.

An embodiment of this application further provides a wireless communication system. The system includes the first access point, the at least one second access point, and the at least one STA in the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. A communication method, comprising:
generating, by a first access point (AP), notification information, the notification information indicates a station (STA) that is to send a channel sounding physical layer protocol data unit (PPDU), the notification information comprises identification information of the STA and identification information of a second AP, the identification information of the STA indicates the STA, and the identification information of the second AP indicates the second AP; and
sending, by the first AP, the notification information to the second AP and to the STA, the notification information being carried in a secondary trigger frame or in a null data packet announcement (NDPA) frame, the secondary trigger frame or the NDPA frame comprising:
a first user information field and a second user information field, the first user information field comprising an association identifier subfield and an AP indication subfield, the association identifier subfield carries a first value, the first value comprising a special association identifier (AID), and the AP indication subfield comprises the identification information of the second AP, the identification information of the second AP is carried in the first user information field, and the identification information of the STA is carried in the second user information field.

2. The method according to claim 1, wherein the identification information of the STA comprises at least one of the following:
an association identifier (AID) of the STA or a media access control (MAC) address of the STA; or
the identification information of the second AP comprises at least one of the following: a group identifier corresponding to the second AP, a basic service set color corresponding to the second AP, a group identifier and a basic service set bitmap corresponding to the second AP, an AID of the second AP, or a MAC address of the second AP.

3. The method according to claim 1, wherein the secondary trigger frame comprises a common information field and a user information field;
the identification information of the second AP is carried in the common information field; and
the identification information of the STA is carried in the user information field.

4. The method according to claim 3, wherein the common information field comprises a trigger type subfield and a trigger dependent common information subfield;
the trigger type subfield indicates a trigger type of the secondary trigger frame; and
the trigger dependent common information subfield comprises the identification information of the second AP.

5. The method according to claim 4, wherein the common information field further comprises a secondary trigger frame subtype subfield that indicates a subtype of the secondary trigger frame.

6. The method according to claim 4, wherein the common information field further comprises the trigger dependent common information subfield;
the trigger dependent common information subfield comprises a secondary trigger frame subtype subfield and an AP indication subfield;
the secondary trigger frame subtype subfield indicates a subtype of the secondary trigger frame; and
the AP indication subfield comprises the identification information of the second AP.

7. The method according to claim 1, wherein the first user information field comprises a first transmitted user information field in the secondary trigger frame or in the NDPA frame.

8. A communication method, comprising:
receiving, by a second access point (AP), notification information sent by a first AP, the notification information indicates a station (STA) that is to send a channel sounding physical layer protocol data unit (PPDU), the notification information comprises identification information of the STA and identification information of the second AP, the identification information of the STA indicates the STA, and the identification information of the second AP indicates the second AP; and
determining, by the second AP based on the identification information of the STA and the identification information of the second AP, that the second AP will receive the channel sounding PPDU sent by the STA;
the notification information being carried in a secondary trigger frame or in a null data packet announcement (NDPA) frame, the secondary trigger frame or the NDPA frame comprising:
a first user information field and a second user information field, the first user information field comprising an association identifier subfield and an AP indication subfield, the association identifier subfield carries a first value, the first value comprising a special association identifier (AID), and the AP indication subfield comprises the identification information of the second AP, the identification information of the second AP is carried in the first user information field, and the identification information of the STA is carried in the second user information field.

9. The method according to claim 8, wherein the identification information of the STA comprises at least one of the following:
an association identifier (AID) of the STA or a media access control (MAC) address of the STA; or
the identification information of the second AP comprises at least one of the following: a group identifier corresponding to the second AP, a basic service set color corresponding to the second AP, a group identifier and a basic service set bitmap corresponding to the second AP, an AID of the second AP, or a MAC address of the second AP.

10. The method according to claim 8, wherein the secondary trigger frame comprises a common information field and a user information field;
the identification information of the second AP is carried in the common information field; and
the identification information of the STA is carried in the user information field.

11. The method according to claim 10, wherein the common information field comprises a trigger type subfield and a trigger dependent common information subfield;
the trigger type subfield indicates a trigger type of the secondary trigger frame; and
the trigger dependent common information subfield comprises the identification information of the second AP.

12. The method according to claim 11, wherein the common information field further comprises a secondary trigger frame subtype subfield that indicates a subtype of the secondary trigger frame.

13. The method according to claim 11, wherein the common information field further comprises the trigger dependent common information subfield;
the trigger dependent common information subfield comprises a secondary trigger frame subtype subfield and an AP indication subfield;
the secondary trigger frame subtype subfield indicates a subtype of the secondary trigger frame; and
the AP indication subfield comprises the identification information of the second AP.

14. The method according to claim 8, wherein the first user information field comprises a first transmitted user information field in the secondary trigger frame or in the NDPA frame.

15. A communication method, comprising:
receiving, by a station (STA), notification information sent by a first access point (AP), the notification information indicates the station (STA) that is to send a channel sounding physical layer protocol data unit (PPDU), the notification information comprises identification information of the STA and identification information of a second AP, the identification information of the STA indicates the STA, and the identification information of the second AP indicates the second AP; and
determining, by the STA based on the identification information of the STA and the identification information of the second AP, that the STA will send the channel sounding PPDU;
the notification information being carried in a secondary trigger frame or in a null data packet announcement (NDPA) frame, the secondary trigger frame or the NDPA frame comprising:
a first user information field and a second user information field, the first user information field comprising an association identifier subfield and an AP indication subfield, the association identifier subfield carries a first value, the first value comprising a special association identifier (AID), and the AP indication subfield comprises the identification information of the second AP, the identification information of the second AP is carried in the first user information field, and the identification information of the STA is carried in the second user information field.

16. The method according to claim 15, wherein the identification information of the STA comprises at least one of the following:
an association identifier (AID) of the STA or a media access control (MAC) address of the STA; or
the identification information of the second AP comprises at least one of the following: a group identifier corresponding to the second AP, a basic service set color corresponding to the second AP, a group identifier and a basic service set bitmap corresponding to the second AP, an AID of the second AP, or a MAC address of the second AP.

17. The method according to claim 15, wherein the secondary trigger frame comprises a common information field and a user information field;
the identification information of the second AP is carried in the common information field; and
the identification information of the STA is carried in the user information field.

18. The method according to claim 17, wherein the common information field comprises a trigger type subfield and a trigger dependent common information subfield;
the trigger type subfield indicates a trigger type of the secondary trigger frame; and
the trigger dependent common information subfield comprises the identification information of the second AP.

19. The method according to claim 18, wherein the common information field further comprises a secondary trigger frame subtype subfield that indicates a subtype of the secondary trigger frame.

20. The method according to claim 18, wherein the common information field further comprises the trigger dependent common information subfield;
the trigger dependent common information subfield comprises a secondary trigger frame subtype subfield and an AP indication subfield;
the secondary trigger frame subtype subfield indicates a subtype of the secondary trigger frame; and
the AP indication subfield comprises the identification information of the second AP.

21. The method according to claim 15, wherein the first user information field comprises a first transmitted user information field in the secondary trigger frame or in the NDPA frame.

* * * * *